(12) United States Patent
Boyd, IV et al.

(10) Patent No.: US 10,618,217 B2
(45) Date of Patent: Apr. 14, 2020

(54) CELLULAR FABRICATION AND APPARATUS FOR ADDITIVE MANUFACTURING

(71) Applicant: Branch Technology, Inc., Chattanooga, TN (US)

(72) Inventors: Robert Platt Boyd, IV, Chattanooga, TN (US); Christopher Weller, Chattanooga, TN (US); Anthony DiSanto, Chattanooga, TN (US); Melody Rees, Chattanooga, TN (US); Bruce Hilbert, Chattanooga, TN (US)

(73) Assignee: BRANCH TECHNOLOGY, INC., Chatanooga, TN (US)

( * ) Notice: Subject to any disclaimer, the term of this patent is extended or adjusted under 35 U.S.C. 154(b) by 69 days.

(21) Appl. No.: 15/488,218

(22) Filed: Apr. 14, 2017

(65) Prior Publication Data
US 2017/0217088 A1 Aug. 3, 2017

Related U.S. Application Data

(63) Continuation-in-part of application No. 15/032,791, filed as application No. PCT/US2014/062514 on Oct. 28, 2014.

(Continued)

(51) Int. Cl.
*B29C 67/00* (2017.01)
*B29C 64/209* (2017.01)
(Continued)

(52) U.S. Cl.
CPC .......... *B29C 64/209* (2017.08); *B29C 64/106* (2017.08); *B29L 2031/10* (2013.01); *B33Y 30/00* (2014.12); *B33Y 80/00* (2014.12)

(58) Field of Classification Search
CPC .... B29C 64/209; B29C 64/106; B29C 64/118
See application file for complete search history.

(56) References Cited

U.S. PATENT DOCUMENTS 3,252,181 A * 5/1966 Hureau ................... F16L 9/127
425/224
4,115,047 A 9/1978 Stelmack
(Continued)

FOREIGN PATENT DOCUMENTS

AU 2013202686 10/2013
CA 2928832 5/2015
(Continued)

OTHER PUBLICATIONS

U.S. Appl. No. 15/032,791, Non-Final Office Action dated Oct. 18, 2017, 10 pages.
(Continued)

*Primary Examiner* — Jason L Lazorcik
(74) *Attorney, Agent, or Firm* — Kilpatrick Townsend & Stockton LLP

(57) ABSTRACT

Freeform, additive manufacturing equipment, processes and products, including residential, commercial and other buildings. A movable extruder places extrudate that solidifies in open space to create "scaffolding" or "skeletons" of buildings and other products. Elongated extrudate elements are fused to each other or connected by other means to form a cellular structure. Filler material such as polymeric insulating foam may simultaneously or thereafter be placed within the cellular structure to contribute desired strength, rigidity, insulative, barrier or other properties. Finish materials may also be applied.

29 Claims, 25 Drawing Sheets

Related U.S. Application Data

(60) Provisional application No. 62/322,602, filed on Apr. 14, 2016, provisional application No. 61/897,309, filed on Oct. 30, 2013.

(51) Int. Cl.
*B29C 64/106* (2017.01)
*B29L 31/10* (2006.01)
*B33Y 30/00* (2015.01)
*B33Y 80/00* (2015.01)

(56) References Cited

U.S. PATENT DOCUMENTS

| | | | |
|---|---|---|---|
| 4,369,153 A | 1/1983 | Nash et al. | |
| 4,593,449 A | 6/1986 | Meray-Hovarth et al. | |
| 4,636,419 A | 1/1987 | Madsen et al. | |
| 4,732,723 A | 3/1988 | Madsen et al. | |
| 4,767,309 A * | 8/1988 | Mizuno | B28B 3/269 264/177.11 |
| 4,877,645 A | 10/1989 | Bleich et al. | |
| 5,217,771 A | 6/1993 | Schmanski et al. | |
| 5,266,021 A | 11/1993 | Jacobson | |
| 5,764,521 A * | 6/1998 | Batchelder | B29C 41/36 700/196 |
| 5,886,702 A | 3/1999 | Migdal et al. | |
| 6,035,583 A | 3/2000 | Papke | |
| 6,214,279 B1 | 4/2001 | Yang et al. | |
| 6,630,221 B1 | 10/2003 | Wong | |
| 6,682,684 B1 | 1/2004 | Jamalabad et al. | |
| 6,730,252 B1 | 5/2004 | Teoh et al. | |
| 6,936,212 B1 | 8/2005 | Crawford | |
| 7,087,200 B2 | 8/2006 | Taboas et al. | |
| 7,153,454 B2 | 12/2006 | Khoshnevis | |
| 7,424,967 B2 | 9/2008 | Ervin et al. | |
| 7,628,600 B2 | 12/2009 | Perret | |
| 8,113,807 B2 | 2/2012 | Wilkinson | |
| 8,155,775 B2 | 4/2012 | Batchelder | |
| 8,166,727 B2 | 5/2012 | Pivac et al. | |
| 8,185,240 B2 | 5/2012 | Williams et al. | |
| 8,186,990 B2 | 5/2012 | Perret et al. | |
| 8,337,736 B2 | 12/2012 | Dini | |
| 8,889,243 B2 | 11/2014 | Hanschen et al. | |
| 2002/0014051 A1 | 2/2002 | Fraval et al. | |
| 2002/0125592 A1 | 9/2002 | Schulman et al. | |
| 2004/0164436 A1 | 8/2004 | Khoshnevis | |
| 2004/0244344 A1 | 12/2004 | Ichikawa | |
| 2005/0072113 A1 | 4/2005 | Collins et al. | |
| 2007/0138678 A1 | 6/2007 | Khoshnevis | |
| 2007/0160820 A1 | 7/2007 | Waters, Jr. | |
| 2008/0128956 A1 | 6/2008 | Perret | |
| 2008/0148683 A1 | 6/2008 | Dini et al. | |
| 2010/0086721 A1 | 4/2010 | Batchelder | |
| 2012/0070523 A1 * | 3/2012 | Swanson | B33Y 30/00 425/96 |
| 2013/0037984 A1 | 2/2013 | Arnauts | |
| 2013/0101746 A1 | 4/2013 | Keremes et al. | |
| 2013/0234369 A1 | 9/2013 | Schwäerzler | |
| 2014/0284832 A1 * | 9/2014 | Novikov | B29C 64/386 264/40.1 |
| 2014/0291886 A1 | 10/2014 | Mark et al. | |
| 2014/0302110 A1 | 10/2014 | Choi et al. | |
| 2015/0165690 A1 | 6/2015 | Tow | |
| 2015/0182811 A1 | 7/2015 | Bender | |
| 2015/0183167 A1 * | 7/2015 | Molinari | B29C 67/0088 425/167 |
| 2015/0217517 A1 * | 8/2015 | Karpas | B33Y 30/00 264/464 |
| 2015/0321434 A1 * | 11/2015 | Sterman | B29D 35/12 264/255 |
| 2015/0367576 A1 * | 12/2015 | Page | B29C 70/30 264/257 |
| 2016/0198576 A1 * | 7/2016 | Lewis | H01L 23/49822 361/761 |
| 2016/0230283 A1 * | 8/2016 | Tseliakhovich | B33Y 10/00 |
| 2016/0263822 A1 | 9/2016 | Boyd, IV | |
| 2016/0297104 A1 * | 10/2016 | Guillemette | B29C 64/106 |
| 2016/0346997 A1 * | 12/2016 | Lewis | B29C 67/0055 |
| 2016/0354896 A1 * | 12/2016 | Lewis | B33Y 80/00 |
| 2017/0173878 A1 * | 6/2017 | Myerberg | B22F 3/008 |
| 2017/0182701 A1 * | 6/2017 | Ryan | B33Y 30/00 |
| 2017/0182709 A1 * | 6/2017 | Ryan | B29C 64/106 |
| 2017/0266887 A1 * | 9/2017 | Roviaro | B33Y 10/00 |
| 2017/0312985 A1 * | 11/2017 | Talgorn | B33Y 80/00 |
| 2017/0320267 A1 * | 11/2017 | Lind | B29C 64/106 |
| 2018/0133670 A1 * | 5/2018 | Lewis | B01F 7/248 |
| 2018/0141274 A1 * | 5/2018 | Fink | B33Y 10/00 |
| 2018/0326660 A1 * | 11/2018 | Gifford | B29C 64/241 |
| 2018/0345577 A1 * | 12/2018 | Takeyama | B33Y 30/00 |
| 2018/0345879 A1 * | 12/2018 | Chapeau | B29C 70/78 |
| 2019/0022934 A1 * | 1/2019 | Kobe | B33Y 10/00 |
| 2019/0030602 A1 * | 1/2019 | Sachs | B05B 5/001 |

FOREIGN PATENT DOCUMENTS

| | | |
|---|---|---|
| DE | 102005062406 | 6/2007 |
| DE | 202006019940 | 9/2007 |
| DE | 102007063561 | 7/2009 |
| EP | 3063341 | 9/2016 |
| WO | 2004083540 | 9/2004 |
| WO | 2010019051 | 2/2010 |
| WO | 2011021080 | 2/2011 |
| WO | 2015034438 | 3/2015 |
| WO | 2015065936 | 5/2015 |
| WO | 2015065936 | 6/2015 |
| WO | 2015193818 | 12/2015 |
| WO | 2017181060 A1 | 10/2017 |

OTHER PUBLICATIONS

International Application No. PCT/US2017/027696, International Preliminary Report on Patentability dated Oct. 25, 2018, 9 pages.
U.S. Appl. No. 15/032,791, Notice of Allowance dated Dec. 12, 2018, 15 pages.
U.S. Appl. No. 15/032,791, "Non-Final Office Action", dated Apr. 10, 2018, 12 pages.
ETH Research Project, Gramazio Kohler Research, ETCH Zurich 2012-2014, Dec. 12, 2016, 2 pages.
Amaral et al., Towards a Robust Solution in Building Automation Systems: Supporting Rapid Prototyping and Analysis, 2012 Eighth International Conference on the Quality of Information and Communications Technology, 2012, 4 pages.
Ceccanti et al., 3D printing technology for a moon outpost exploiting lunar soil, 61st International Astronautical Congress 2010, vol. 11, 2010, 9 pages.
Craveiro et al., Functionally graded structures through building manufacturing, Advanced Materials and Engineering Materials II, vol. 683, 2013, pp. 775-778.
De Grassi et al., Development of an automatic four-color spraying device carried by a robot arm, Automation and Robotics in Construction—Proceedings of the 24th International Symposium on Automation and Robotics in Construction, 2007, 6 pages.
European Application No. 14859196.9, Communication pursuant to Rule 114(2) EPC dated Dec. 21, 2016, 4 pages.
Gramazio Kohler Research, Mesh Mould, http://gramaziokohler.arch.ethz.ch/web/e/forschung/221.html, 2012-2016, 2 pages.
Griffith et al., Computing & materializing non-uniform shapes, An evolutionary approach to generate and digital fabricate non-uniform masonry walls, CAADRIA 2006—The Association for Computer-Aided Architectural Design Research in Asia: Rhythm and Harmony in Digital Space, 2006, pp. 227-235.
Gu et al., 3D Hierarchically Parametric Design Method for Cast-in-Place Concrete Structures, Journal of Computer Aided Design & Computer Graphics (Dec. 2010), vol. 22, No. 12, Dec. 2010, pp. 2147-2154.
Hack et al., Overcoming Repetition: Robotic fabrication processes at a large scale, International journal of architectural computing, vol. 11, No. 3, 2013, pp. 285-299.

(56) References Cited

OTHER PUBLICATIONS

Khoshnevis, Automated construction—Future prospects, IIE Annual Conference and Exhibition 2004, 2004, pp. 3419-3430, Copy Unavailable.

Khoshnevis, Extending RP to large scale fabrication—Automated house construction, IIE Annual Conference and Exhibition 2004, 2004, pp. 723.

Ko et al., Development of automatic reinforcement bar placement for RC walls based on structural building information modeling (S-BIM), Manufacture Engineering, Quality and Production System II, Advanced Materials Research, vol. 711, 2013, pp. 623-628.

Lim et al., Developments in construction-scale additive manufacturing processes, Automation in Construction, vol. 21, No. 1, Jan. 2012, pp. 262-268.

Moum et al., What did you learn from practice today Exploring experiences from a Danish R&D effort in digital construction, Advanced Engineering Informatics, vol. 23, No. 3, Jul. 2009, pp. 229-242.

International Published Application No. PCT/US2014/062514, International Preliminary Report on Patentability dated May 12, 2016, 7 pages.

International Published Application No. PCT/US2014/062514, International Search Report and Written Opinion dated Mar. 4, 2015, 8 pages.

Pottmann et al., Geometry of multi-layer freeform structures for architecture, ACM SIGGRAPH 2007 Papers—International Conference on Computer Graphics and Interactive Techniques (2007), 2007, 11 pages.

Rael et al., Developing concrete polymer building components for 3D printing, Integration Through Computation—Proceedings of the 31st Annual Conference of the Association for Computer Aided Design in Architecture, 2011, pp. 152-157.

Reed, 3D printing in the architectural-engineering-construction market, RAPID 2011 and 3D Imaging Conferences and Exposition, 2011, pp. 1-7.

Ruan et al., Direct three-dimensional layer metal deposition, Journal of Manufacturing Science and Engineering, Transactions of the ASME, vol. 132, No. 6, Dec. 2010, pp. 064502-1-064502-6.

Sass, Synthesis of design production with integrated digital fabrication, Automation in Construction, vol. 16, No. 3, May, 2007, pp. 298-310.

Song et al., Development of a BIM-based structural framework optimization and simulation system for building construction, Computers in Industry, vol. 63, No. 9, Dec. 2012, pp. 895-912.

Villalon et al., Breaking down brick walls: Design, construction, and prototype fabrication knowledge in architecture, Proceedings of the 27th International Conference Extended Abstracts on Human Factors in Computing Systems, CHI 2009, 2009, 8 pages.

Zhang et al., Optimal machine operation planning for construction by Contour Crafting, Automation in Construction, vol. 29, Jan. 2013, pp. 50-67.

Zhou et al., Discussion of the construction design methodology considering both evolutionary structural optimization and 3d printing technology, Applied Mechanics and Materials I, vol. 275-277, 2013, pp. 2616-2619.

International Application No. PCT/US2017/027696, International Search Report and Written Opinion dated Jul. 18, 2017, 10 pages.

AU Patent Application No. 2017248748, "First Examination Report", dated Jun. 6, 2019, 4 pages.

U.S. Appl. No. 16/360,237, "Non-Final Office Action", dated Oct. 29, 2019, 12 pages.

CA Patent Application No. 3,020,994, "Office Action", dated Sep. 11, 2019, 6 pages.

* cited by examiner

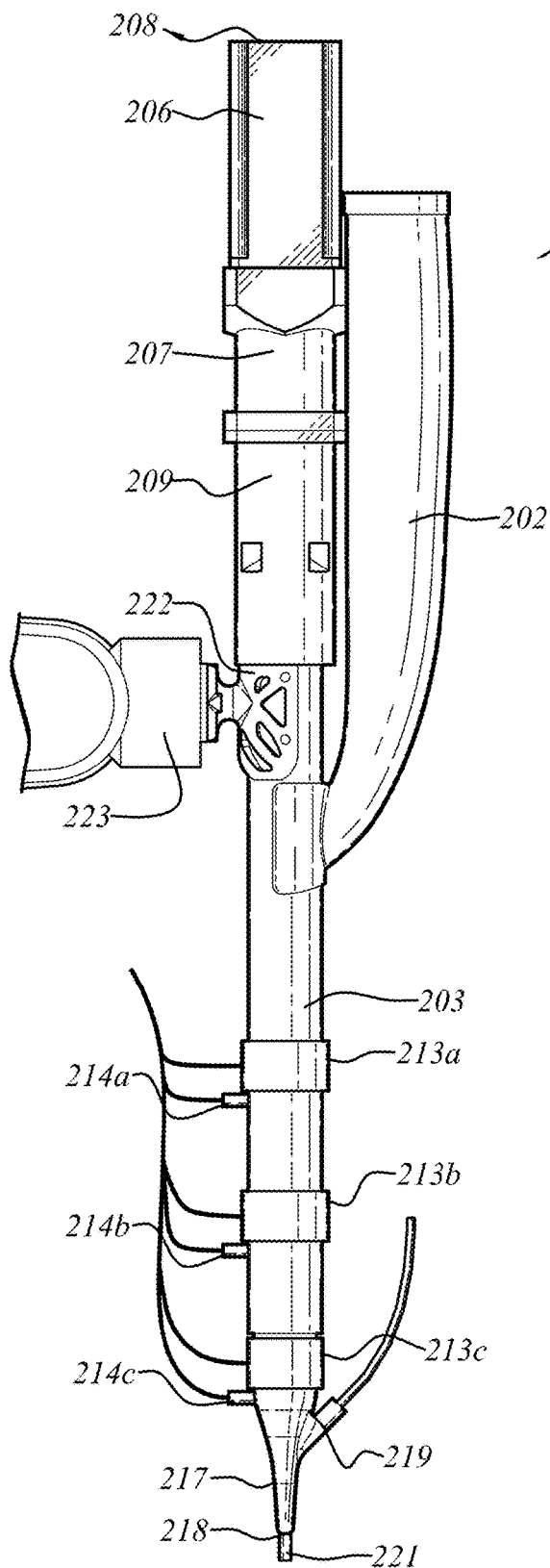
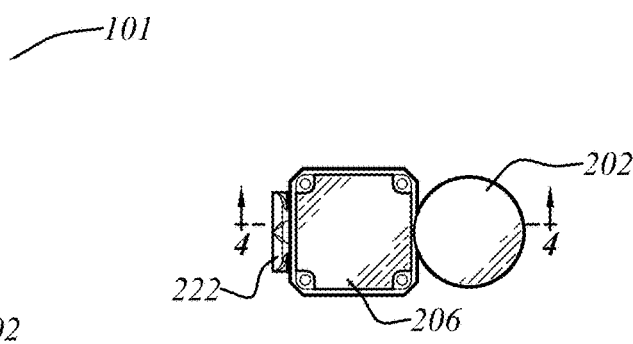
*Fig 7*
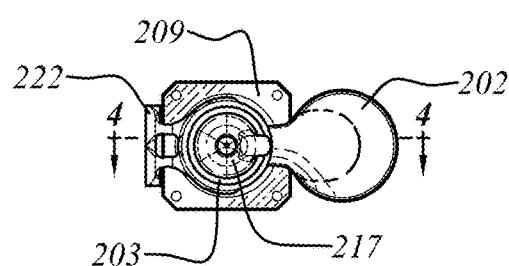
*Fig 6*  *Fig 8*

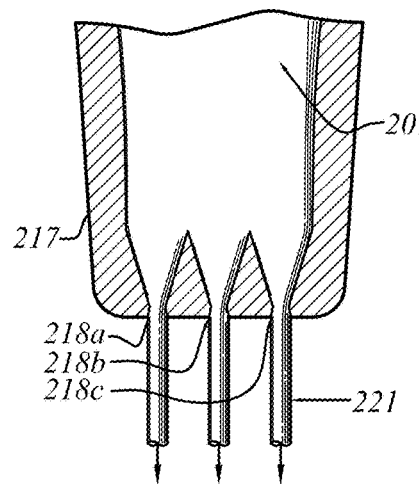
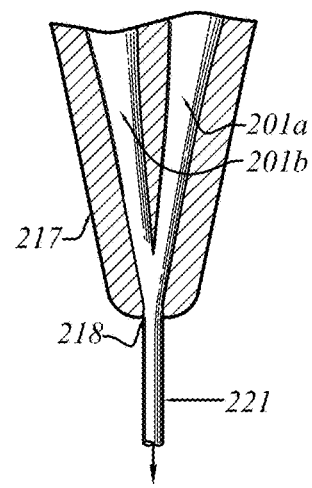
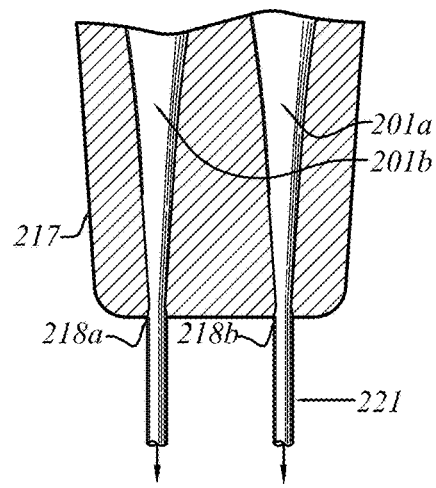
*Fig 14*  *Fig 15*  *Fig 16*
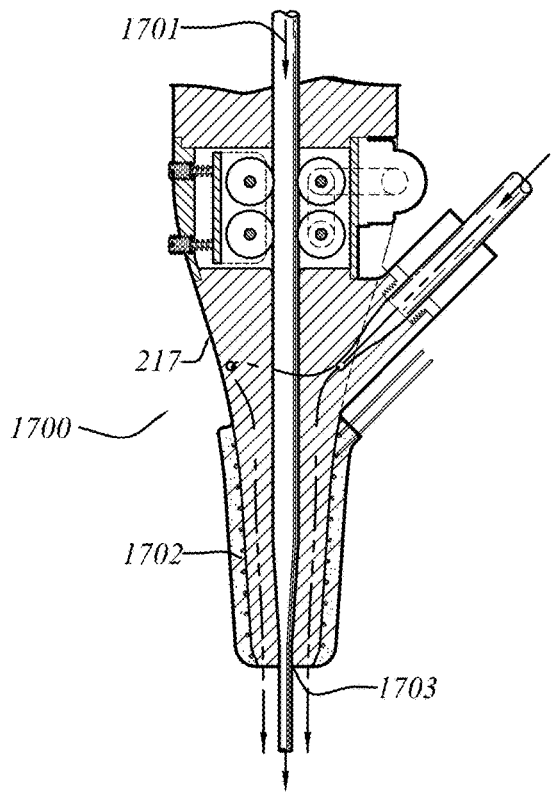
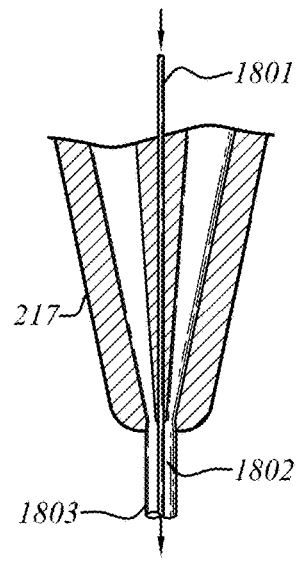
*Fig 17*  *Fig 18*

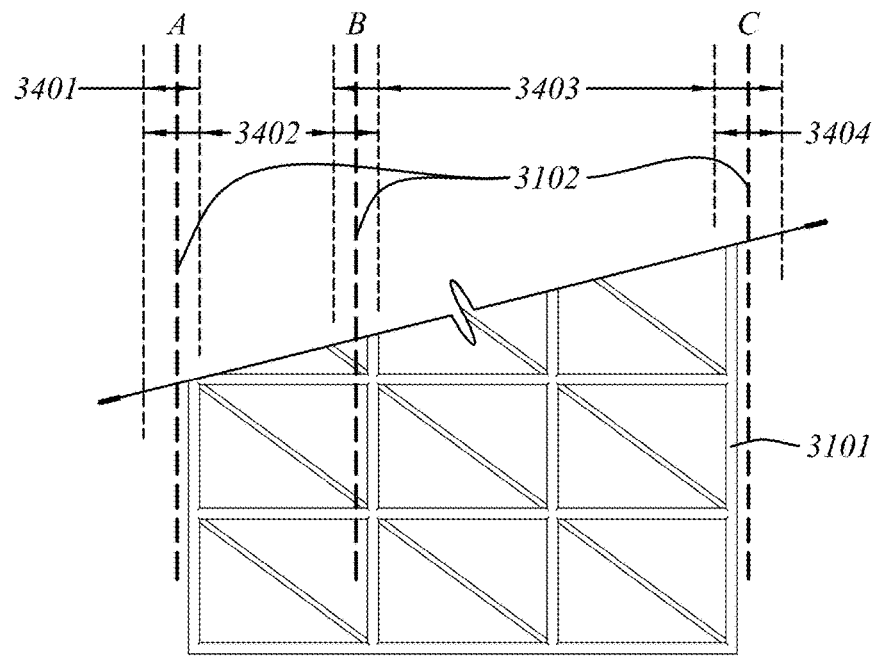
*Fig 34*
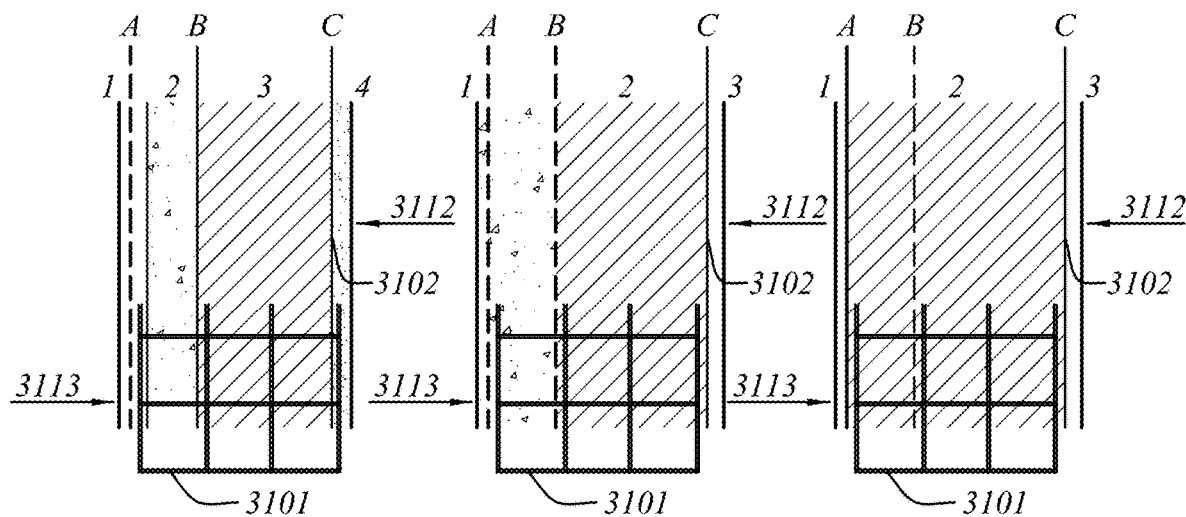
*Fig 35a*  *Fig 35b*  *Fig 35c*

CELLULAR FABRICATION AND APPARATUS FOR ADDITIVE MANUFACTURING

CROSS-REFERENCE TO RELATED APPLICATION

The present application claims benefit of priority to U.S. Provisional Application No. 62/322,602, filed Apr. 14, 2016. The present application also claims benefit of priority to the following: U.S. Non-Provisional application Ser. No. 15/032,791, having a § 371 (c) date of Apr. 28, 2016, which is a National Stage Entry of International Application No. PCT/US2014/062514, filed Oct. 28, 2014, which claims benefit of priority to U.S. Provisional Application No. 61/897,309, filed on Oct. 30, 2013. All of the applications referenced in this paragraph are hereby incorporated in their entireties by this reference.

FIELD OF THE INVENTION

This invention relates to additive manufacturing, manufacturing equipment and products, including the design and production of buildings and other structures of all kinds.

BACKGROUND

Additive manufacturing has been in use for some time whereby objects are built up with small layers of various materials over time. Among others, methods of additive manufacturing include fused deposition modeling, selective laser sintering, and stereolithography to form these layers. All of these methods create an object by "slicing" the virtual object into layers that are then deposited one on top of the other until the final object is formed.

Typical methods for forming a structure include the addition of preformed objects together in sequence to form a larger building or other object. Buildings have been constructed using systems of materials that combine to form a composite assembly having many beneficial characteristics such as structural support, insulation, water resistance, and finished surfaces.

The conventional construction of objects or buildings involves materials that are cast, cut, machined, or extruded in various forms and are then combined together to form the final object or building. Many components are cut or customized in the field by removing material from the piece to fit it into the assembly. Within a typical building the shape of a beam or wall is calculated to resist its maximum load and then the entire beam or wall is of uniform shape and depth to account for the maximum load. This method of designing and constructing buildings has been in use since the first buildings were constructed. By contrast, in a natural system, material is at a premium and therefore the shape of an object is optimized for minimal use of the material. Current construction practice largely ignores nature's example. Building elements are designed for speed of manufacture and building erection; largely without consideration of material efficiency or flexibility of form. Customized shapes or structures are expensive and therefore rarely used in current construction practice.

Additive manufacturing techniques are currently in very limited use to produce large structures.

For instance, a toy used for freeform additive manufacturing uses plastic filament that is melted and pushed through a heated nozzle to extrude in open space. It is useful only as a toy without much control over the temperature, rate of extrusion, or feedstock material.

Metallic freeform sintering is also in use for a process called Direct Metal Deposition (DMD) whereby particles of metal are ejected from a nozzle while a high powered laser fuses the particles to the previously built up substrate while being controlled by a robotic arm.

One larger scale example involves use of brick-like modular plastic parts produced with a scaled up, layered Fused Deposition Modeling (FDM) approach. These units are then combined with other parts to form a larger building. Another method is adopts a similar approach with modular clay bricks that are 3D printed with an extruder mounted on a robotic arm.

At least two other methods utilize large gantry cranes to deposit material. One produces a building through layered deposition of cement with a gantry crane mechanism that is larger than the building being built. Another approach produces a large structure through the use of powdered stone material laid down in layers with a polymeric binder.

Another method attaches a plastic extruder to a robotic arm and is used to produce tension elements similar to cocoons or spider webs over a metal framework. Another similar effort uses a mechanism with a filament extruder on the end of a robotic armature to produce single material concrete walls where the mesh acts as 'leaking formwork' and the extrusions act as horizontal wall ties between the faces of the wall.

Existing 3D printing technology produces objects that are built up in a layered format through different means and materials, but are limited to small build volumes and a layer-wise buildup of material. Most examples exclusively use the 3D printed material to construct a structure and are constrained to the build volume of the printing mechanism employed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

This invention relates to an apparatus and process of freeform additive manufacturing to create structures that are used as a scaffold onto which other materials are applied. It includes an extruder that positions or deposits solidified or soon to be solidified material in open space to create objects by connecting points to create pathways with a movement mechanism. As used here, the terms "construction" and "structure" and related terms are used in their broadest senses, ranging between the construction of a molecular structure up through the fabrication of building, ship and airliner structures.

Aspects of this invention replicate the manner in which natural structural systems are formed on a cellular basis and filled with other materials by providing apparatus and methods to construct structures similar in theory to natural formation by using cost effective materials and methods.

According to certain embodiments of the present invention, a three dimensional object comprises: a. a structure of elongated members produced by an extruder, each of which members is bonded to at least one other member to form a connected structure of members having interstitial spaces, and b. filler in at least some of the interstitial spaces.

In some embodiments, the object further comprises a different filler in at least some of the other of the interstitial spaces.

In certain embodiments, the object comprises a building.

In some embodiments, structure of elongated members comprises a thermoplastic material.

In certain embodiments, the filler comprises insulating foam.

In some embodiments, the filler comprises concrete.

In certain embodiments, the filler contributes at least one of structural integrity, thermal insulation, rigidity, strength and a fluid barrier.

In some embodiments, the structure has at least two sides and further comprising a finish material applied to at least one of the structure sides.

In certain embodiments, the object further comprises a different finish material applied to at least another of the structure sides.

In some embodiments, the elongated members are reinforced by fibers incorporated in the members.

In certain embodiments, the fibers comprise at least one of fiberglass, carbon, ceramic and polymer.

According to certain embodiments of the present invention, an apparatus for constructing a structure comprises: a. an extruder for extruding structural components, b. a movement device for moving the extruder along multiple predetermined paths while the extruder is extruding structural components to place the structural components in desired positions and connected to selected ones of the other components as the components are produced, and c. a controller for moving the extruder and controlling operation of the extruder.

In some embodiments, the apparatus further comprises a means for facilitating solidification of the extrudate in open space.

In certain embodiments, the apparatus further comprises fluid conveyed proximate extrudate from the extruder to facilitate solidification of the extrudate.

In some embodiments, the fluid comprises compressed air.

In certain embodiments, the fluid comprises liquid.

In some embodiments, the fluid is recirculated.

In certain embodiments, the apparatus further comprises a placing device for placing interstitial material within at least a portion of the extruded components structure.

In some embodiments, the placing device comprises a sprayer for polymer insulating foam.

According to certain embodiments of the present invention, a method for designing and constructing a structure comprises: a. designing or selecting a structure design, b. designing a cellular structure having interstitial spaces for at least some of the structural components of the structure design, c. providing a program for controlling movement and operation of an extruder to produce the cellular structure for the at least some structural components, d. operating the extruder controlled by the program to produce the cellular structure, e. filling at least a portion of the interstitial spaces with a low density filler material, and f. applying a finish material to at least some of the structural components.

In certain embodiments, the method further comprises applying a second finish material to at least some of the structural components.

In some embodiments, the method further comprises extruding and attaching a decorative element attached to at least one of the structural elements.

According to certain embodiments of the present invention, a three dimensional object comprises: a. a cellular matrix structure comprising a framework of a plurality of extrudate members intersecting at joints, the framework further defining interstitial spaces, and b. filler in at least some of the interstitial spaces.

In some embodiments, the three dimensional object further comprises a different filler in at least some of the other of the interstitial spaces.

In certain embodiments, the object comprises components of a building.

In some embodiments, framework of the plurality of extrudate members comprises a thermoplastic material.

In certain embodiments, the filler comprises insulating foam.

In some embodiments, the filler comprises concrete.

In certain embodiments, the filler contributes at least one of structural integrity, thermal insulation, rigidity, strength and a fluid barrier.

In some embodiments, the cellular matrix structure has at least two sides and further comprising a finish material applied to at least one of the cellular matrix structure sides.

In certain embodiments, the building further comprises a different finish material applied to at least another of the cellular matrix structure sides.

In some embodiments, the plurality of extrudate members are reinforced by fibers incorporated in the extrudate members.

In certain embodiments, the fibers comprise at least one of fiberglass, carbon, ceramic and polymer.

In certain embodiments, at least some of the joints are located in an interior area of the cellular matrix structure.

In some embodiments, at least some of the joints located in the interior area of the cellular matrix structure comprise intersections of at least three extrudate members extending in three different directions.

In certain embodiments, the cellular matrix structure defines at least one repeating pattern of cells.

In some embodiments, at least three of the plurality of extrudate members extend along three different extrudate pathways.

In certain embodiments, the cellular matrix structure comprises a scaffold for the filler.

In some embodiments, at least some of the plurality of extrudate members include a plurality of arms in cross-section.

According to certain embodiments of the present invention, an apparatus for constructing a structure comprises: a. an extruder for extruding structural components, b. a movement device for moving the extruder along multiple predetermined paths while the extruder is extruding structural components to place the structural components in desired positions and connected to selected ones of other components as the components are produced, and c. a controller for moving the extruder and controlling operation of the extruder.

In some embodiments, the apparatus further comprises a means for facilitating solidification of the extrudate in open space.

In certain embodiments, the apparatus further comprises fluid conveyed proximate extrudate from the extruder to facilitate solidification of the extrudate.

In some embodiments, the fluid comprises compressed air.

In certain embodiments, the fluid comprises liquid.

In some embodiments, the fluid is recirculated.

In certain embodiments, the apparatus further comprises a placing device for placing interstitial material within at least a portion of the extruded components structure.

In some embodiments, the placing device comprises a sprayer for polymer insulating foam.

In certain embodiments, the apparatus further comprises a nozzle comprising at least one extrudate passageway and at least one fluid passageway, the fluid passageway configured to convey a fluid proximate an extrudate to facilitate solidification of the extrudate.

In some embodiments, the extruder further comprises a shaped extruder orifice with a plurality of arms in cross section.

In certain embodiments, the extruder is configured to incorporate a fiber reinforcing into an extrudate.

In some embodiments, the extruder further comprises a nozzle that mechanically modulates a cross sectional area of extrudate.

According to certain embodiments of the present invention, a method for designing and constructing a structure comprises: a. designing or selecting a structure design, b. designing a cellular structure having interstitial spaces for at least some of the structural components of the structure design, c. providing a program for controlling movement and operation of an extruder to produce the cellular structure for the at least some structural components, d. operating the extruder controlled by the program to produce the cellular structure, e. filling at least a portion of the interstitial spaces with a filler material, and f. applying a finish material to at least some of the structural components.

In certain embodiments, the method further comprises applying a second finish material to at least some of the structural components.

In some embodiments, the method further comprises extruding and attaching a decorative element attached to at least one of the structural components.

In certain embodiments, producing the cellular structure comprises building up the components in an additive manner.

In some embodiments, producing the cellular structure comprises building up a structure without supplemental supports.

In certain embodiments, producing the cellular structure comprises producing the cellular structure by extruding along a sequential or plurality of sequential pathways.

Major Objective

One of the major objectives of this apparatus and process is to create structures at various scales in an efficient manner. This enables the construction of buildings in a manner more creative and efficient than conventional methods. These can be applied to smaller and larger scale structures, because the apparatus and method are scale agnostic.

In one embodiment of this apparatus, an extruder is attached to a movement mechanism that moves the extruder (or a nozzle attached to the extruder) between points to create freeform extruded pathways in order to fabricate a cellular matrix acting as a scaffold onto which additional materials may be applied.

Extruder

An extruder heats material to make it fluid, or mixes or otherwise handles materials that are at least transitorily fluid, dispensing the fluid from a nozzle in a controlled manner that, upon exit from the nozzle, rapidly solidifies to become a segment within a cellular matrix. The extruder may use various means such as heating, mixing, or airflow to control the solidification process or it can be otherwise controlled, for instance, through use of chemical compositions that solidify through molecular crosslinking, catalysis or other mechanisms.

Movement Mechanism

While the extruder is operating and material is dispensing from the nozzle, die or other structure, the nozzle is moved from point to point to create freeform "pathways" or elements of extrudate. Ideally the speed of extrusion and the speed of motion are synchronized. One method of moving the nozzle is using a multi-axis industrial robot.

Cellular Matrix

A "cellular matrix," as used here, is a larger object made up of modular connected volumes where some portion of those volumes are bounded by connected segments of extrudate. This is similar to a 3D diagram or other representation of plant or animal cells or the chemical structures of minerals or fluids. The simplest versions are like three-dimensional trusses, spanning in all directions rather than in a single plane. Additional examples of cellular matrices occurring in nature include honeycomb, crystalline, plants, bone, foam, spiders web, voronio diagram or tessellation structures, and human cells.

Minimum Solution

By contrast with other methods of fabrication using extrusion, in one aspect this invention seeks to conserve time and materials. The fundamental objective is not maximum use of a material or process, but rather use of as little material as possible to produce a particular structure.

While the techniques, structures and materials of this invention may be used to create solid or maximum structures, it is advantageous to produce structures using minimal amounts of a given material. For instance, the objective may be to design and produce a structure that is optimized for strength but is reasonably economical in using the least amount of material possible to provide the necessary strength and other beneficial characteristics. On the other hand, a "maximum" could be conceptualized as a solid or constant depth structure that is not optimized for its loading conditions. Where other methods seek to use their method to create maximum structures, one useful approach with this invention seeks to pursue optimized minimum structures.

In these methods of construction, the space between the pathways is filled with other materials. These other materials may have (and typically will have) entirely different characteristics than the materials of the pathways. These other materials may become an exterior shell, interior structure, insulating medium, conducting medium, air space, or other advantageous use of the space.

Because of the modular nature of a cellular matrix structure where each module does not have to be the same, more design flexibility is possible, enabling production of different structures and structures with different components and functions. A naturally-occurring analogy is provided by a tree; the same basic cell makes up the entire structure, but there are no two trees that are exactly the same. Because of the freeform nature of the pathways it is possible to fabricate structures that would be impossible or too costly to produce with normal construction methods.

This enables architectural design for freeform buildings and other structures, when traditional building methods would be impossible or prohibitively expensive. More specifically, this approach enables greater design flexibility and the creation of freeform structures not otherwise possible using conventional beam or sheet products. Aspects of this invention permit design and construction of structures akin to natural structures seen in the human body, animals, insects, plants, or mineral formations.

Elements of this invention may be used either on a job site or in a factory setting. These methods are mostly additive rather than subtractive in nature, allowing materials to be deposited where needed for the beneficial characteristics of structure or form, but where materials are not needed the method may be material efficient.

Process

The practice of this invention may begin with a designed object or structure, typically using a CAD program. A given cellular matrix pattern is applied to the volume of the object or walls of the structure. The design of this cellular matrix takes into account the depths of the materials to be applied and the application methods. This matrix is then translated to a sequential path for constructing each segment with the extruder and movement mechanism, that may be controlled using robotic code. This process moves the end of the extruder along the prescribed pathways to create the extruded segments of the cellular matrix. At each joint with the extrudate or another substrate, the heat of the extrudate (or another appropriate mechanism) fuses or otherwise connects or bonds the extrudate to create a solid joint. With this method the overall form of the structure is created as a scaffold onto which other materials are added. The composite structure is created by adding, curing and finishing other materials.

Materials

The cellular matrix may be useful on its own, but a much stronger composite assembly may be created by the addition of other materials that conform to and fill some or all of the open spaces in the matrix, in some instances forming an integral bond with the cellular matrix material(s). In one example of building construction, spray foam insulation, concrete, and gypsum materials are used to fill the cellular matrix. Layers within the added materials may be created by the addition of barriers within the cellular matrix. For instance, spray foam can be blown into the matrix from the interior side of the wall with a septum layer that prevents the liquid foam from significantly penetrating further into the wall assembly. This allows spray foam to rise in one direction to a certain depth for a desired R-value. Multiple septum layers may also be incorporated for various purposes.

The material used in the extruder may be almost any material that can be heated and cooled to become a solid or that can otherwise be extruded in fluid form and later solidify. Some of the possible materials include thermoplastic, thermoset, metallic, organic, or other materials, including materials that may be pulverized and recombined with a binder. Most materials commonly used in extrusion may be used. For instance, acrylonitrile butadiene styrene ("ABS") plastic resin may be fed into the extruder in pellet form. ABS plastic in filament form may also be used. The addition of a structurally enhancing fiber within the melt may also be used such as a glass, ceramic, carbon or other fiber that is continuous or separately mixed into the ABS resin compound.

Extruder

One version of an extruder of this disclosure processes plastic resin with an extrusion screw driven by a motor. Plastic pellets are fed into a barrel where they are pulverized and melted through friction and external heat sources to a controlled temperature. Once the plastic is fluid it may pass through a nozzle assembly where it is regulated and formed into a certain shape. Just prior to exit and/or upon exit from the nozzle, heat is removed from the extrudate so that it solidifies in open space. Heat may be removed through various means, including, without limitation, air flow within or surrounding the nozzle and after the extrudate reaches the nozzle orifice. Another heat removal method may include the circulation of a heat transfer fluid, either or both of liquid or gas, including fluids that change phase during use.

It is typically desirable for the temperature of the extrudate to be high enough for the extrudate to fuse to other parts while also allowing the extrudate to solidify in open space without additional support. Typically the extrudate is produced in sufficient quantity and shape to be self-supporting from a fused joint to a point where changes of direction or attachment by fusion to another extrudate segment is accomplished.

Alternative extrudate-to-extrudate attachment methods are also possible, including, for instance, chemical, mechanical or other bonding or attachment.

Aspects of this invention provide an apparatus and method that uses materials efficiently to quickly produce buildings and other structures with optimal structural performance and great capacity for customization.

Nozzle

A nozzle that forms the extrudate into a certain shaped profile and then extrudes it out of an orifice is one preferred embodiment. In this case a fluid may be passed over the extrudate within and or outside of the nozzle that may cool the extrudate to solidify it upon exit from the orifice.

The nozzle may also incorporate a shaped die that can add significant structural performance and desirable cooling characteristics and reduce overall material consumption. The shape of the extrudate may have multiple protrusions in various directions such that the cooling flows over or between the protrusions to facilitate solidification. A desirable general principle may include increasing the surface area to facilitate cooling while decreasing the cross sectional area of the extrudate. The cross section of the extrudate may also be shaped such that the moment of inertia about its centroid is maximized in order to increase its structural qualities.

The nozzle contemplated may be desirably manufactured in an additive manufacturing method such that the cooling and other systems within it may be more closely integrated than can be achieved with traditional casting or machining methods.

The extruder assembly and nozzle may incorporate additional systems which enhance the accuracy and strength of connections between the extrudate members within the cellular matrix through marking, position sensing, and welding methods.

Extrudate

The cross-section geometry and material composition of the extrudate produced by the extrusion mechanism may be geometrically and materially configured to best achieve one or more of the following qualities: rapid transition of the material from a molten to a solid or otherwise self-supporting state, various structural performance criteria of the cellular matrix component being fabricated, and integration with additional materials added to the cellular matrix to form a composite assembly.

Septum

A septum may be a generally planar layer within the cellular matrix that significantly stops the flow of added materials from penetrating further into the cellular matrix. A septum layer may be incorporated within the interior volume of the matrix, or may be affixed to an outer surface. In any of these locations, a septum may not be planar but instead may conform to the three dimensional shape of the cellular matrix component.

Different materials may be incorporated on either side of a septum within the cellular matrix and may utilize the septum material to form a strengthened composite. For instance, an architectural wall assembly may be made up of the following layers, from interior to exterior: gypsum, a septum which serves as a lath, a foam partially contained by the septum, and concrete. Multiple septums may be placed within the matrix to achieve a wide variety of material and composite configurations.

Septum Enclosure

A septum surface is one embodiment which facilitates the application of multiple materials to the cellular matrix. Another embodiment may utilize the septum to form a partially closed volume within the matrix so as to form a sleeve, column, or other distinct region which receives a material or component of the assembly. For instance, a tube configuration of a septum may be filled with concrete to form a structural column within a foam wall assembly. Another septum may be inflated with air to form a void within a matrix which is filled with material, such that the void may become a raceway to accommodate utility components such as plumbing, ductwork, or electrical conduit.

Composite

The cellular matrix may serve as a functional structural or other component without the application of additional materials. However, the incorporation of additional infill materials may provide superior performance, particularly where the properties of the cellular matrix and infill materials are suitable to form a composite. Here, the term 'composite' refers to a combination of materials which offers performance that is measurably superior to that of the individual materials. This is often achieved by combining materials which have opposing modes of failure. Such a composite is formed, for example, by the combination of the cellular matrix, which may tend to fail by buckling, and a foam which braces the members of the matrix. In this case, the matrix provides stiffness to prevent excessive deflection of the foam, and the foam provides bracing to prevent the members of the matrix from buckling.

A composite may be formed by integrating the cellular matrix and other materials in a wide variety of ways. Bonding between the matrix and a material may be achieved through adhesion, welding, mechanical bonding, chemical additives, fasteners, or various other means. In particular, the chemistry and shape of the extruded members of the matrix may be configured to integrate with a desired infill material.

Freeform Additive Manufacturing

The cellular matrix may be manufactured in an additive manner, wherein material is progressively deposited and solidified upon the structure already formed by previous deposition. Existing additive manufacturing methods deposit or fuse material in successive planar layers, wherein the layer being created relies upon the layer beneath for support. The novelty of freeform additive manufacturing is the simultaneous deposition and solidification of the material, which allows material to be added at any orientation, thus circumventing many of the constraints and issues associated with layer-based methods. In particular, the ability to create unsupported spanning and cantilever features without a secondary support structure is a significant advantage over existing methods. The degree and rate of solidification of the extruded material may be precisely controlled, so as to facilitate adhesion of the material to form strong bonds between members.

Freeform additive manufacturing allows for material to be selectively solidified to extrude in any orientation without regard to support material for horizontal overhangs. Freeform additive manufacturing may build on the side of an object. The build platform may also be from a ceiling or wall assembly.

Selective Solidification

An integral benefit of this embodiment of additive manufacturing is the ability to freeform print and selectively solidify the extrudate in open space, then switch to a molten process of additive manufacturing where material is still plastic upon exit from the nozzle and may be built up in a non-freeform or layerwise manner. Material may be 3D printed that is built up in a layerwise manner and then switch to freeform printing at any point. Process variables modulate whether material is freeform or molten upon exit from the nozzle and may be switched back and forth as the need may arise.

The nozzle may extrude material built up in a layerwise manner with a profiled cross section. The profiled cross section may allow for greater interlayer adhesion, mechanical engagement and prevent z-layer delamination. With profiled extrusion and integral cooling it may be possible to additively manufacture items without heated build platforms or heated build enclosures as is common with typical 3D printing methods Elements of the matrix may also be printed in a layer-based configuration where advantageous. In this case, the shaped profile of the extrusion may allow for greater interlayer adhesion, mechanical engagement, and prevent z-layer delamination. With shaped extrusion and integral cooling it may be possible to additively manufacture items without heated build platforms or heated build enclosures as is common with typical 3D printing methods. The orientation of successive layers may also be varied beyond the world xy plane, allowing the mechanical properties of the structure to coincide more appropriately with structural loading conditions than is possible with other methods.

Multi-Block

The efficiency of the cellular matrix creation process is enhanced by utilizing repeated motions over a predefined matrix block pattern. A block is one portion of a larger object that may be a well-ordered, consistently dimensioned, set of points that is conformed to the desired geometric shape. Employment of such a block allows the extrusion to be parsed into a set of patterns through the unit parts of the blocks. By utilizing the pattern defined in this block the extrusion has predictable points of support and may be conducted consistently from one portion of the matrix to the next. Further the predictable pattern of extrusion allows greater control over other process variables such as temperature and speed.

The use of the predefined matrix block pattern allows the generation of truss structures which may be designed to minimize overall warping of the printed matrix structure. This patterning may allow for consistent cross-bracing in all directions orthogonal to the geometric orientation. Such bracing, in turn, may provide strength which averts the considerable warping of the overall structure as it cools.

The use of predefined matrix block patterns allows concatenation of the overall blocks to form a general traversal of whatever overall shape is desired. The extrusion pattern as well as the blocks themselves may be scale agnostic and, thus, need only be constructed so that scale is amenable to the extrusion parameters. Thus, the advantages of the predefined matrix block pattern may be applied to more complex geometries through the linking of the blocks themselves.

BRIEF DESCRIPTION OF THE DRAWINGS

Illustrative embodiments of the present invention are described in detail below with reference to the following drawing figures:

FIG. 6 is a view of the front of the extruder shown in FIG. 2.

FIG. 7 is a top view of the extruder shown in FIG. 2.

FIG. 8 is a bottom view of the extruder shown in FIG. 2.

FIG. 14 depicts a nozzle with multiple orifices.

FIG. 15 depicts a nozzle with multiple material sources.

FIG. 16 depicts a nozzle with multiple orifices supplied from multiple materials sources.

FIG. 17 depicts an exemplary nozzle showing feedstock in filament form.

FIG. 18 depict a nozzle that extrudes materials together with a fiber.

FIG. 34 is a diagram illustrating various configuration locations for a septum and added materials.

FIGS. 35a, 35b, and 35c are various example configurations of the septum and added materials.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Extruder

Figure 1:
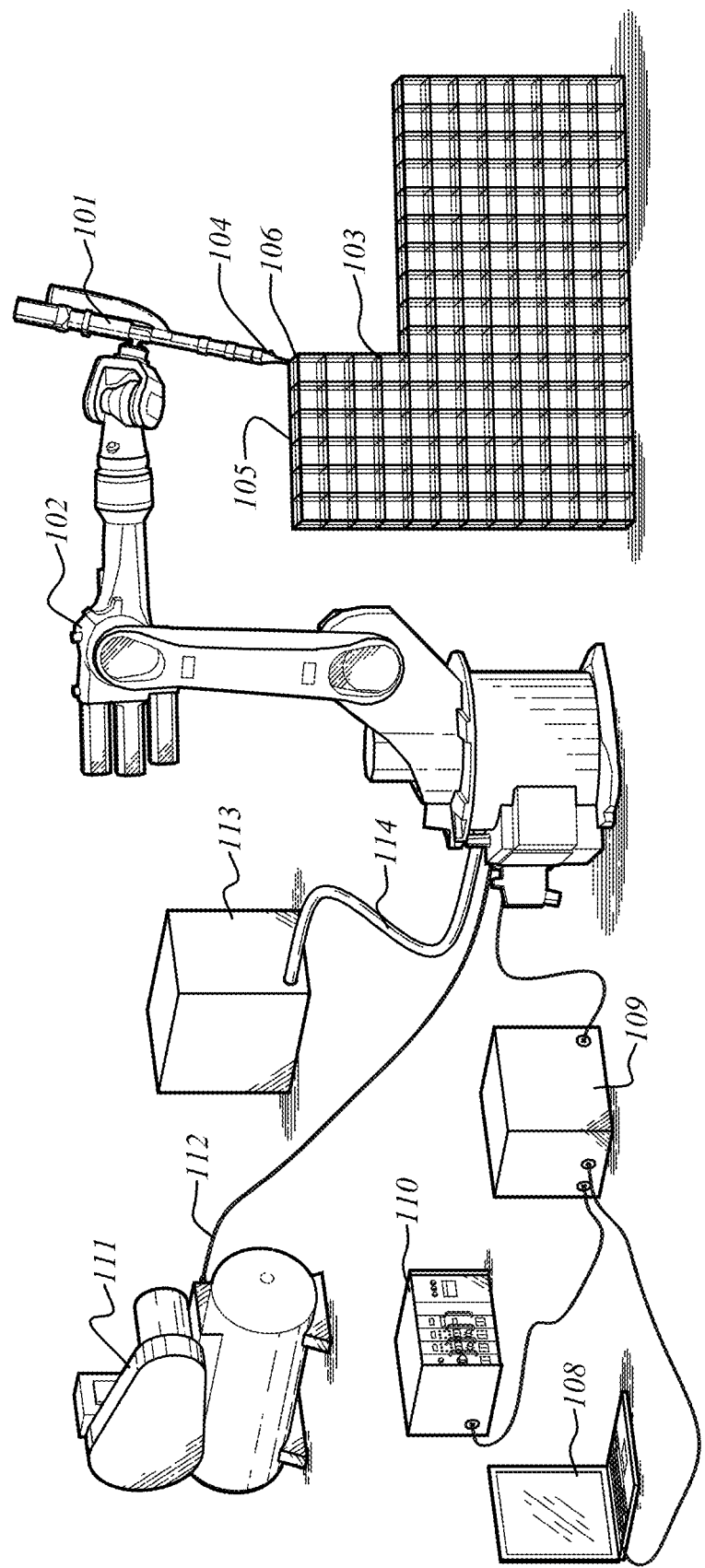
FIG. 1 is a perspective view of one embodiment of this invention.
Figure 2:
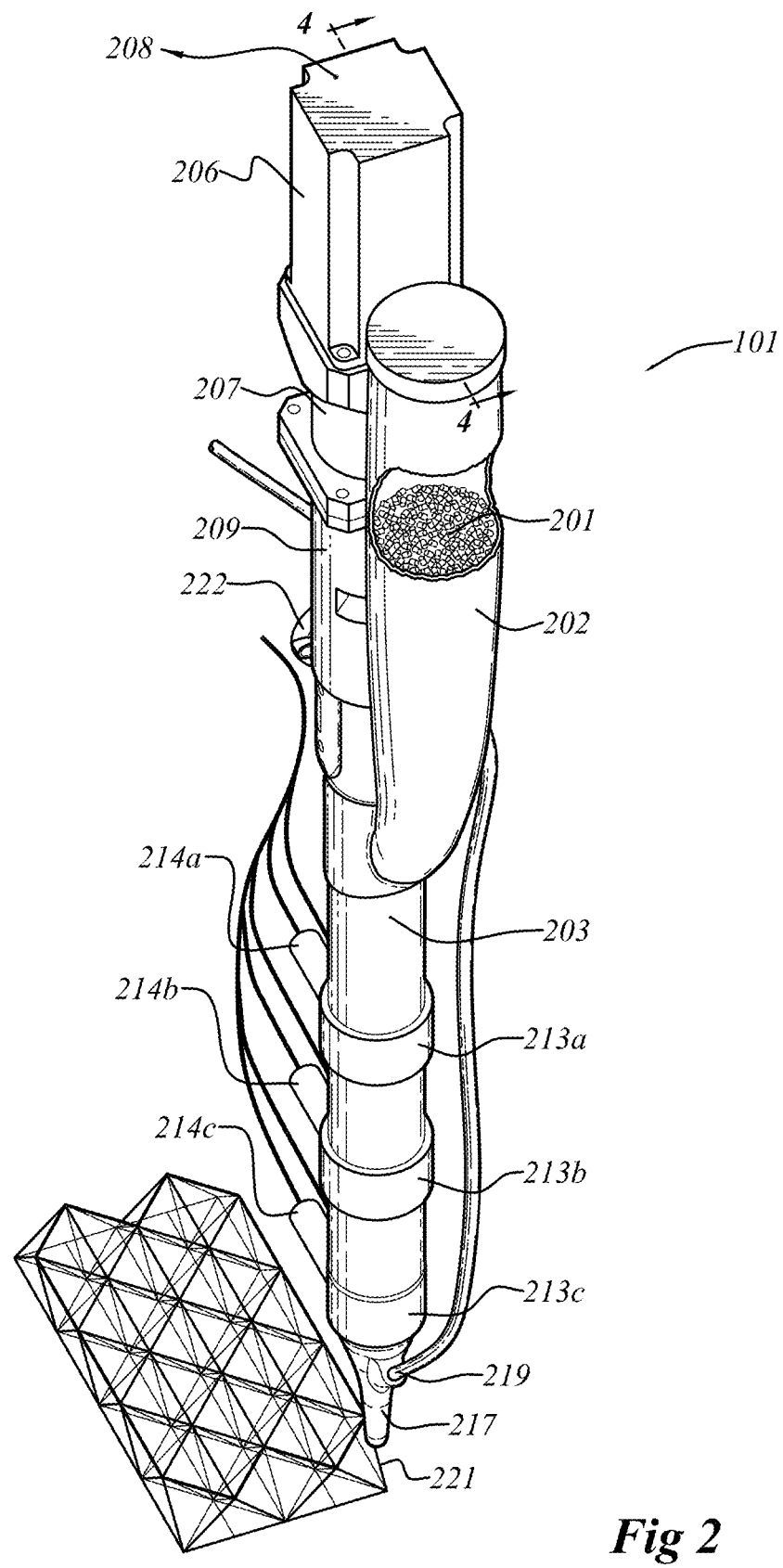
FIG. 2 is axonometric view of an exemplary extruder mechanism of this invention.
Figure 3:
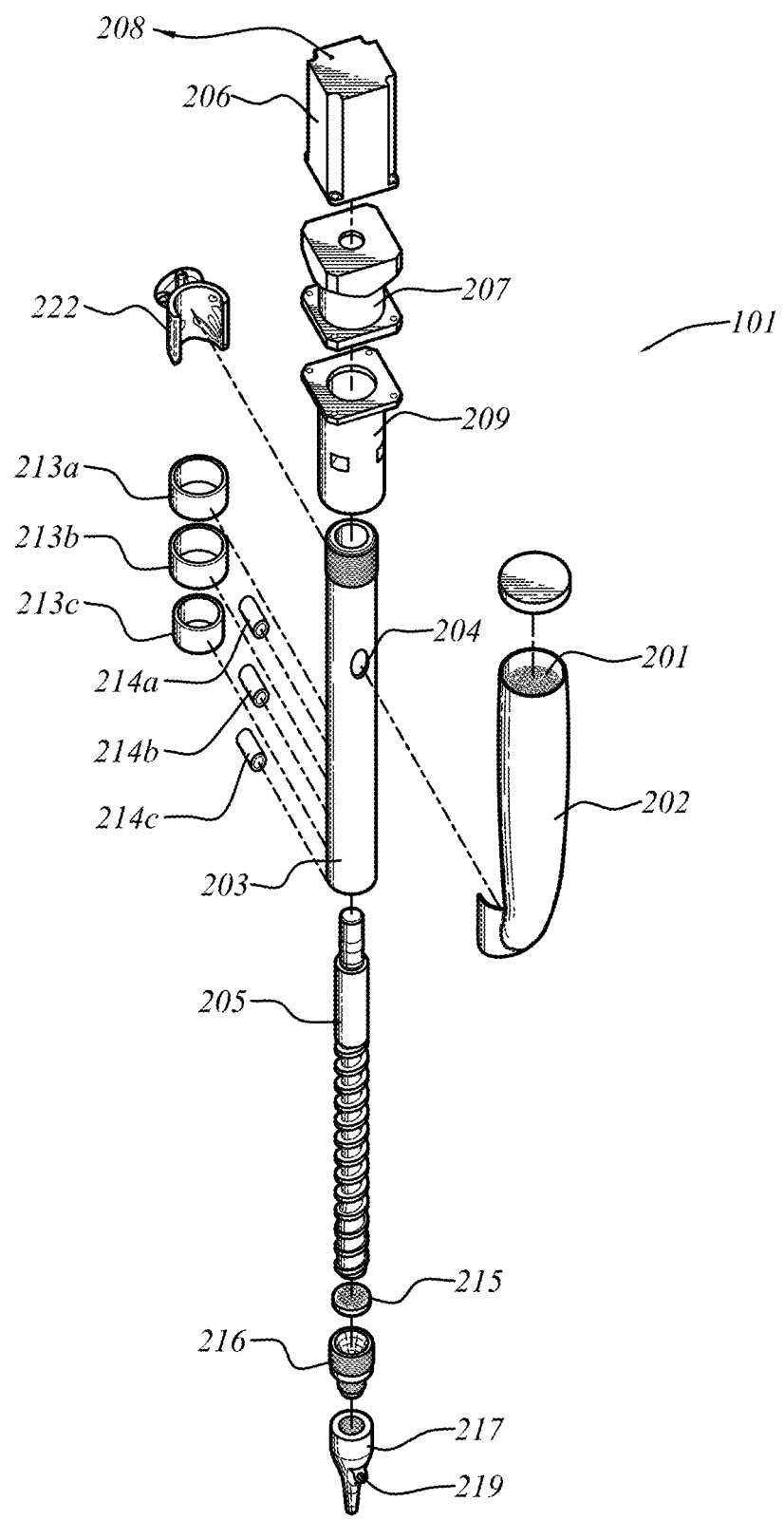
FIG. 3 is an exploded axonometric of the extruder mechanism shown in FIG. 2.
Figure 4:
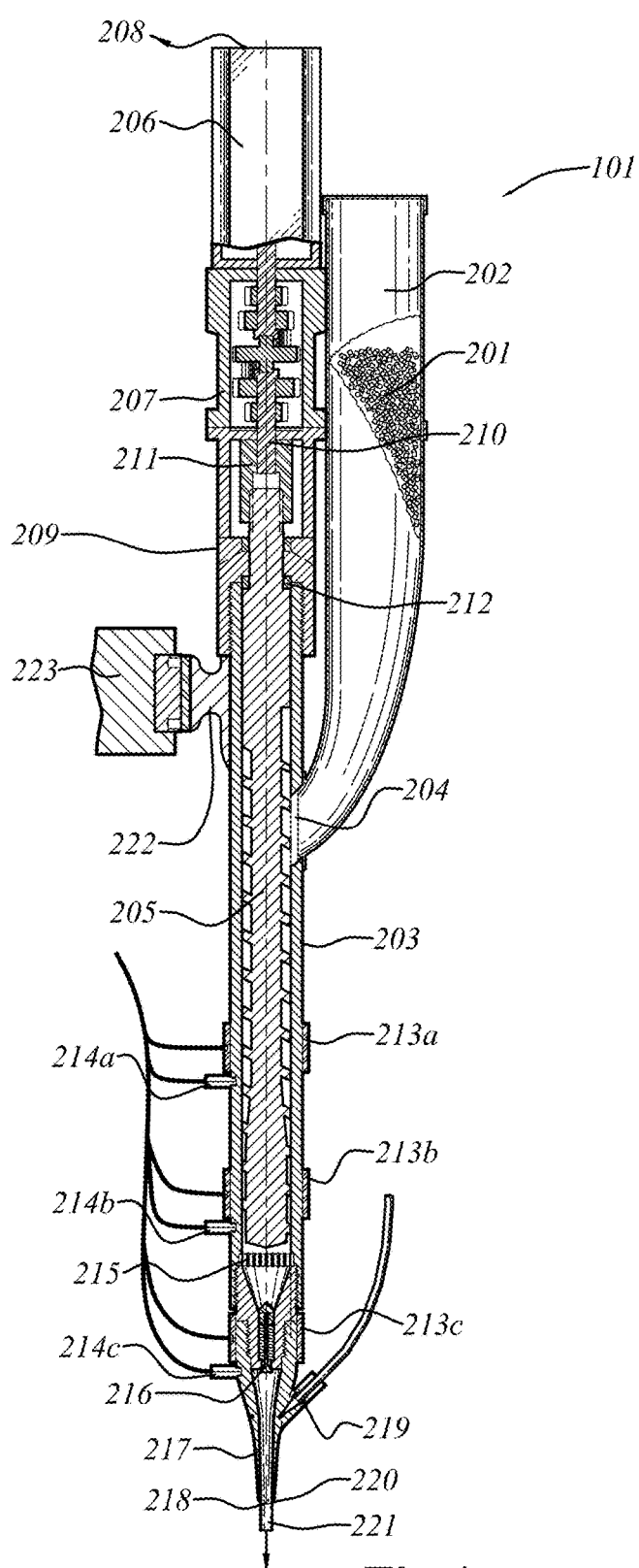
FIG. 4 is a section through the long axis of the extruder-shown in FIG. 2.
Figure 5:
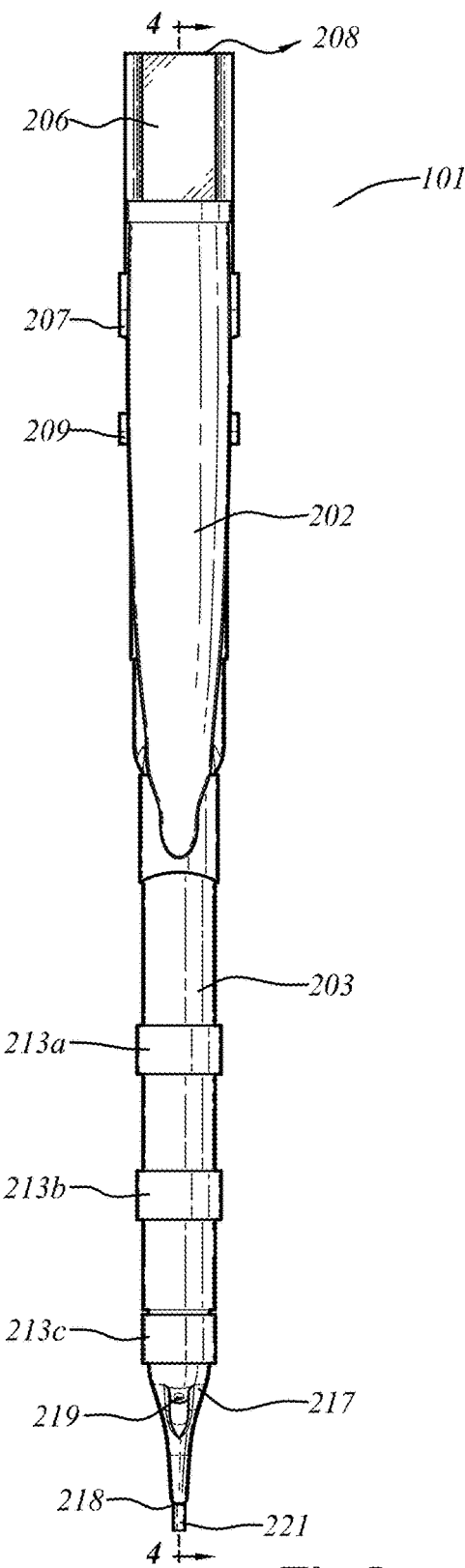
FIG. 5 is a view of one side of the extruder shown in FIG. 2.

In one embodiment of this invention, depicted in FIG. 1, an extruder assembly 101 is manipulated by a robotic armature system 102 to fabricate a structure 103. The nozzle end 104 of extruder assembly 101 is moved along a pathway 105 while material is dispensed from the orifice 106 of the nozzle 104 at a controlled rate. Once the material exits the orifice 106 it is rapidly cooled by air jets that harden the extrudate to a solid that can be formed without support for a given segment length. As the extruder 101 dispenses material, the motion of the extruder through space at a controlled speed is coordinated with the extrusion rate such that material is dispensed along a pathway in a controlled manner. The rate of deposition may be faster or slower than the induced motion to create varying effects. The motion is programmed or controlled via computer 108 that is coupled to a controller 109 that controls the motion of the robot 102. Temperature is controlled by a thermostatic temperature controller 110 attached to the heating elements of the extruder 101. Air pressure and air movement are supplied by an air compressor 111 fed to the extruder via a hose 112. Material is fed to the extruder mechanism 101 from a supply source 113 via a material feed system 114.

As illustrated in FIGS. 2-8, an exemplary extruder 101 holds material 201 in pellet form temporarily in a hopper 202 that feeds the material into the barrel 203 of the extruder through an opening 204. Within the barrel 203 a screw 205 rotates to pulverize, partially melt, and dispense the material. The screw is preferably designed for the particular extrusion process in use. The rotation of the screw is driven by a motor assembly 206 that may include a gear assembly 207 to control the motor speed and a motor controller 208 to regulate the speed of the motor 206.

The motor 206 may be mounted to the thrust bearing assembly 209 with the motor drive shaft 210 connected to the screw by a coupling 211. The thrust bearing assembly contains means to resist the thrust of the screw with a rotational thrust bearing 212.

As the material is pushed along by the extrusion screw, heat is applied to facilitate the melting process by various means, such as resistance heater bands 213 mounted around the extruder at various locations. Other methods to add heat may include other resistance heat methods such as cartridge heaters, or coil heaters. Other methods such as heated air, heated fluids, vibratory, ultrasonic, infrared, direct current interaction or lasers may be used. Temperature may be monitored by thermocouples 214 and controlled thermostatically at each heater band 213.

A breaker plate 215 with holes in a variety of patterns may be used to generate back pressure in the barrel and ensure a consistent mixture in the extrudate. A shutoff valve 216 may be employed that controls the flow of the extrudate. Valve 216 may work in coordination with the pressures induced by the rotation of the screw 205 to open and close a spring loaded opening mechanism, or it may be controlled in other manners, such as pneumatically.

An extruder may be monitored as to location, temperature, flow rate and otherwise with great precision, enabling manipulation of the extruder and control of the extrudate it produces with similarly great precision. For instance, a pressure transducer may be used to monitor internal pressure within the barrel. Temperature sensors within the barrel and or within the melt may be used to precisely control the temperature of the material.

Nozzle

The nozzle 217 (sometimes called a "die") forms the shape of the material and dispenses it from an orifice 218. The heat may be removed from the material by means of air flow 219 cooling through and out of the nozzle 217 through opening 220 so that the air flows around extrudate 221. The air may also be used to remove heat within the nozzle without flowing onto the extrudate 221.

FIGS. 9-12 depict structures that use other fluids that may also recirculate out of the nozzles and that may include supplementary heating and cooling systems. These fluid passageways may be internal or external to the nozzles.

Figures 9, 10, 11, 12:
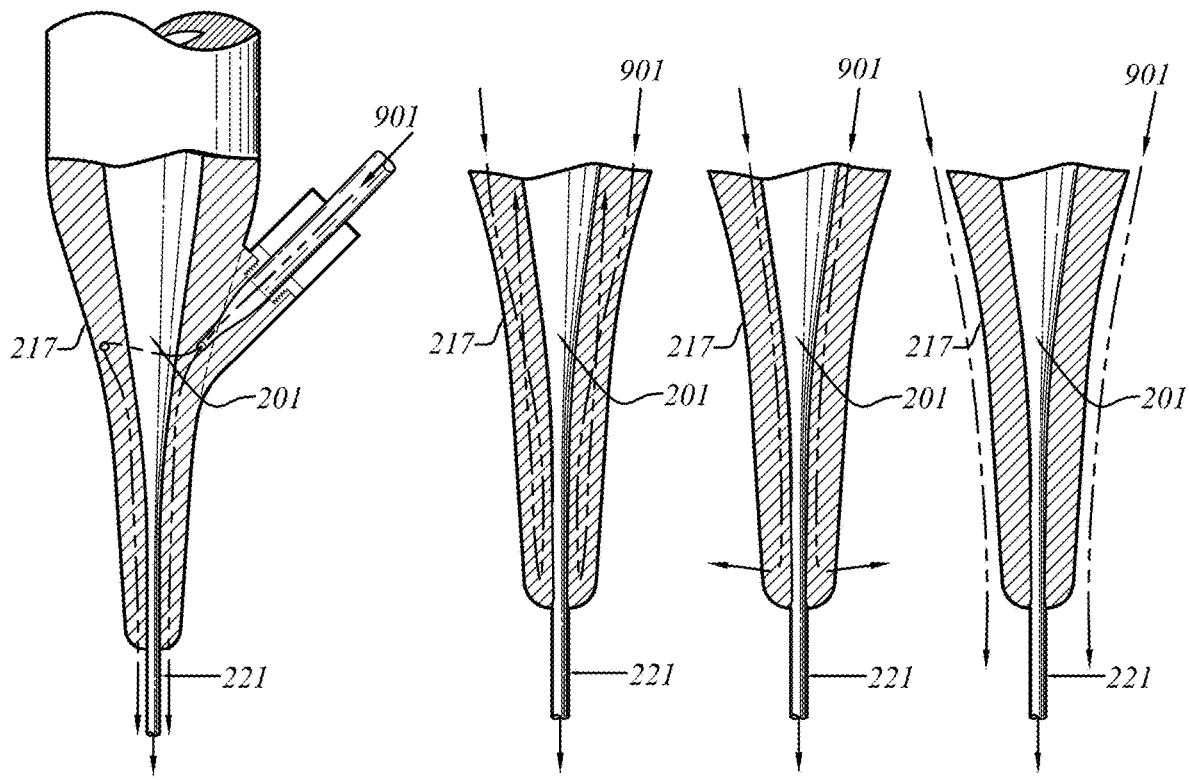
FIGS. 9-12 depict nozzle heat transfer variations.

FIG. 9 illustrates a system where a fluid 901 is introduced into the nozzle 217 that circulates around the material 201 while it is moving through the nozzle 217. This fluid then exits nozzle 217 and flows over the extrudate 221. The fluid may either be a liquid or a gas.

FIG. 10 employs a similar fluid as FIG. 9 except the fluid 901 re-circulates and does not flow over the extrudate 221. FIG. 11 illustrates a similar approach as FIGS. 9 and 10 but the fluid 901 exits the nozzle and does not flow directly onto the extrudate 221. FIG. 12 illustrates a similar approach as FIG. 9 except that the fluid 901 circulates external to the nozzle and does not flow within the nozzle proper. The fluid 901 may circulate around the nozzle and flow onto the extrudate 221.

Motor speed, valve operation, temperature control, and heat removal may all be controlled and operated in coordination with each other or may be controlled separately.

Figure 13:
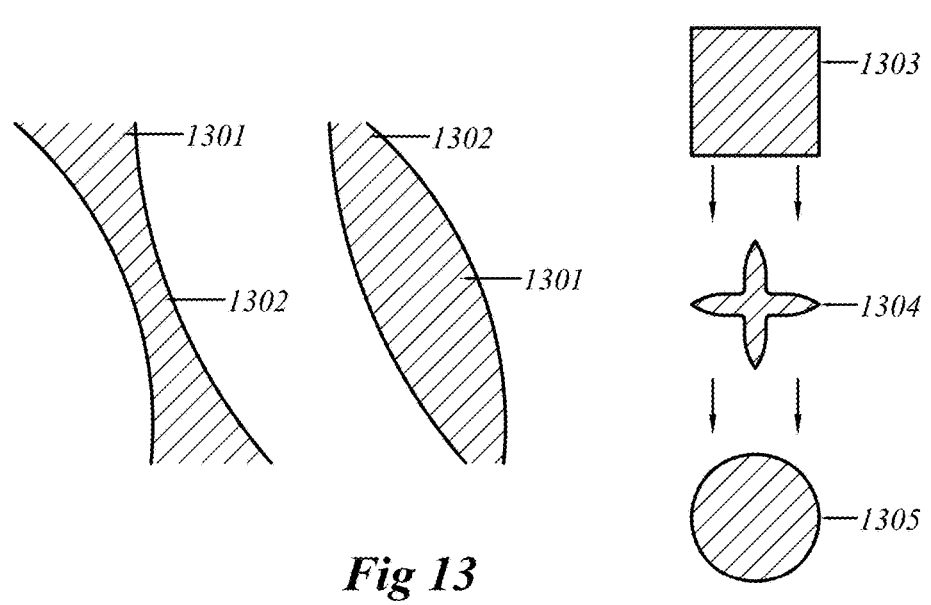
FIG. 13 depicts alternative extrudate shapes.

The shape of the extrudate 221 may be adjusted by various methods, either by changing nozzles, dynamically adjusting the shape of the extrudate 221, or changing the rate of motion causing the material to accumulate or stretch as shown in FIG. 13. The shape of the extrudate may be modulated to be thicker 1301 or thinner 1302 in certain areas or the cross section may be changed from one shape 1303 to another shape 1304 or 1305.

FIGS. 14, 15 and 16 depict nozzle variations, including nozzles that dispenses extrudate from multiple holes simultaneously, nozzles that dispenses extrudate from two components and or at different times in a connected or disconnected manner. FIG. 14 illustrates a nozzle 217 with multiple orifices 218 extruding from one material source 201. FIG. 15 illustrates a nozzle 217 with one orifice 218 combining multiple material sources 201a and 201b that may be mixed prior to exit from orifice 218 or extrude in a laminated format. FIG. 16 illustrates a nozzle 217 with multiple orifices 218a and 218b that are supplied from multiple materials sources 201a and 201b that may be controlled together or separately.

Filament

FIG. 17 depicts an alternative extruder assembly 1700 that operates similarly to a common 3D printer whereby filament 1701 is fed into a heating chamber 1702, is melted, and extruded from the nozzle 1703. The nozzle 1703 would work similarly to the description of nozzles in FIGS. 9-12, except that the material from which the extrudate is formed is initially in filament form rather than pellet form.

Materials

Among many other existing and yet-to-be-developed materials, ABS plastic resin becomes fluid within a range of temperatures but in a controlled manner depending on the desired result. ABS with a fibrous or other additive may be used to change certain properties of the extrudate. Various other thermoplastics may be utilized to achieve similar results.

Any other materials may be used that can be extruded through an orifice and then rapidly solidify. Some of these may be thermoplastic, thermoset, epoxies, wax, polymer, metallic, foam, organic, cementitious, ceramic, biological, or other existing and later-developed materials. Some such materials are fluids above certain temperatures and rapidly solidify when their temperature drops.

Figure 48:
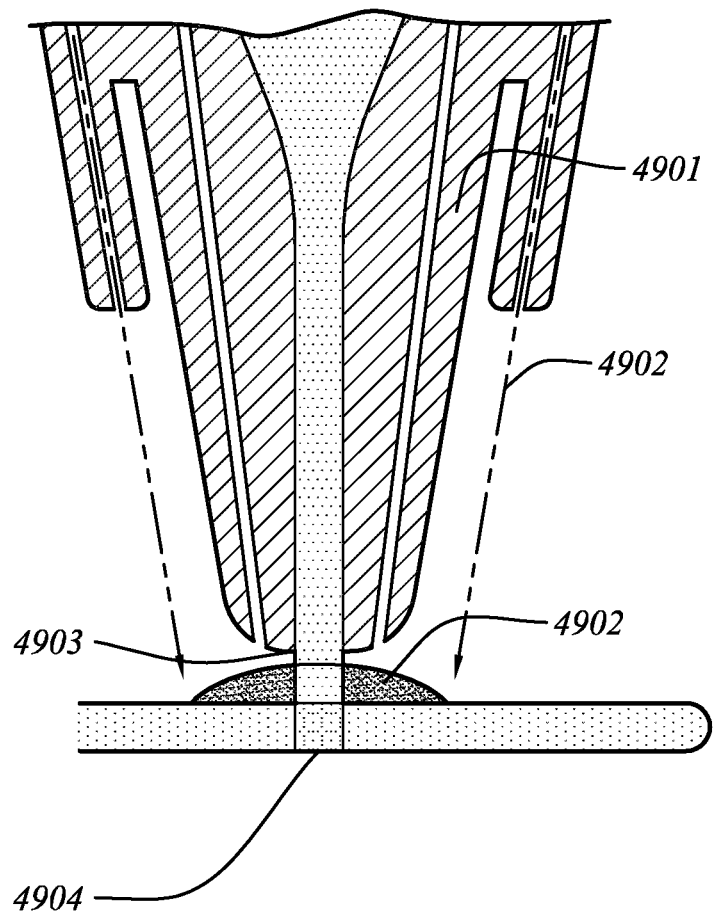
FIG. 48 depicts a nozzle with a bonding agent at connections within the cellular matrix.

Other usable materials may solidify as a result of chemical processes such as two-part materials, like some epoxies that crosslink and solidify after the two parts are combined, or other materials that crosslink after introduction of a catalyst, or exposure to moisture or ultraviolet light. Some such materials bond to themselves, at least when contact occurs above certain temperatures or before chain linking or other chemical reactions have fully occurred. Other materials systems may utilize a structural extrudate and a separately supplied bonding material or agent dispensed at the points of contact of the structural extrudate, such as a cyanoacrylate or other fast-acting adhesive. One embodiment of this method is shown in FIG. 48.

One method of reinforcing the extrudate is through the addition of a continuous or broken strand(s) of fiber reinforcing. Common materials used for this may include glass fiber, ceramic fiber, metallic wire, or carbon fiber strands. As depicted in FIG. 18, the fiber 1801 is incorporated into the melt 1802 such that the melt may encapsulate the fiber 1801 strand to reinforce each segment of the cellular matrix fabricated from the fiber 1801 and melt 1802 extrudate 1803.

Other existing and future extrusion techniques may also be employed to combine materials or enhance extrusion, including use of a mandrel or air or other fluid or by, for instance, utilization of bladed sheet flow or blown film extrusion techniques.

Motion

Extruder nozzle motion may be accomplished in any way that places the nozzle where it needs to be at a particular time. In one embodiment, as generally depicted in FIG. 1, extruder and nozzle movement is provided by a multiple axis industrial robot 102. The extruder 101 is attached to the robot 102 by means of a bracket assembly 222 shown in FIGS. 2, 3, 4 and 6 that which mounts to the end of the armature 223 shown in FIGS. 4 and 6.

The robot 102 is programmatically controlled by a computer 108 to execute the motion necessary to create the desired cellular matrix pathways. One method for producing this motion is by drawing the cellular matrix in a CAD program that is then translated into a sequential motion process- to control the robot 102. This motion is programmed to include information that coordinates the extrusion speed, temperature control, cooling mechanism and other parameters for extrusion.

Figure 19:
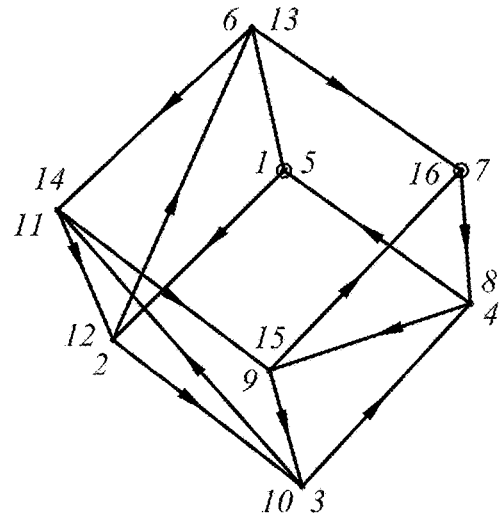
FIG. 19 is an exemplary isometric view of segments in accordance with this invention.
Figure 20:
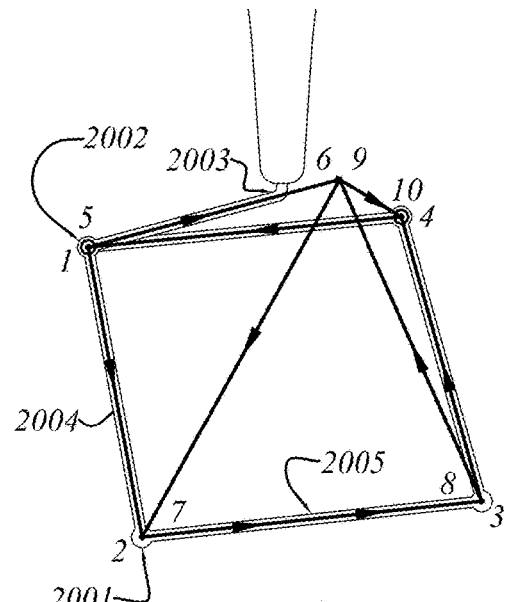
FIG. 20 is an isometric view of exemplary robot movement.

Such a basic motion control program allows the movement mechanism to move from one point to another point along a prescribed path at a certain speed as shown by reference to exemplary three dimensional shapes in FIGS. 19 and 20. While the robot 102 is executing such movement of the extruder 101 and attached nozzle 217, the extruder motor 208 may also be activated at a prescribed speed, a material shutoff valve 216 may be opened, temperature of various portions of the apparatus and the material may be monitored and heating or cooling mechanism(s) may be turned on or off as appropriate. The motion of the robot may pause to create (as shown in FIG. 20) a node 2001 or joint 2002 built up with the extrudate 2003. The cooling or heating systems may turn off or on to modulate solidity in the extrudate 2003 viscosity or other flow characteristics. Motor 206 speed may also be changed to increase or decrease the extrudate flow out of the extruder 101. The rate of extrusion, rate of motion, heat transfer, cooling, heating and fusing are coordinated to produce a solid filament of desired shape and size along the prescribed pathway bonded to other filaments or other structures where desired.

Sequence

As shown in FIGS. 19 and 20 the program sequence and resulting nozzle movement allows material to be added that connects to previously deposited material at joints without passing back through previously applied material. This programming determines the overall shape of the final structure along with all the interconnected sequential segments forming a part of it.

Segments

Figure 21:
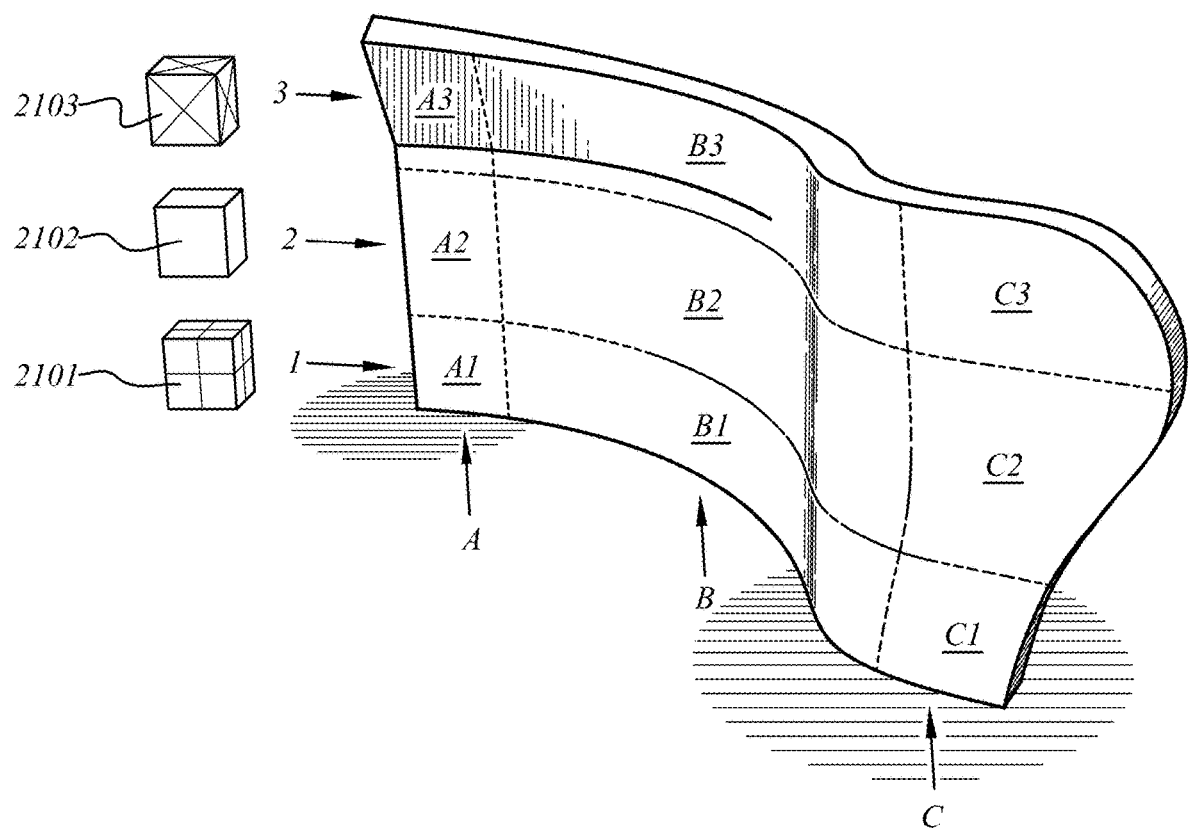
FIG. 21 is an isometric view of an exemplary wall illustrating programming ranges of patterns within a wall.

Each of these segments such as segments 2004 and 2005 in FIG. 20 may be derived by breaking down the cellular matrix into pathways such as the path 2-3 and the joint 1, 5. Each pathway is assigned characteristics such as speed of extrusion, speed of motion, temperature, and cooling. These characteristics determine how elements such as segments 2004 and 2005 and the resulting structure comprised by those elements will be built up. Once a region of the cellular matrix (like the cells depicted in FIGS. 19 and 20) is complete, additional material is added to build up the structure in a horizontal and/or vertical manner by the addition of more cells Range Programming Another method of building up the cellular matrix in lieu of discreet pathway programming is illustrated in FIG. 21. In this technique, certain patterns of material deposition 2101, 2102, or 2103 are applied to similarly structured volumes of space. The program may dictate the application of a certain cellular pattern over a particular range without having to program each discreet motion step. In this manner, a structure may be divided into ranges that would inform the pattern formation by the robot and the motion programming may be substantially simplified.

The example wall illustrated in FIG. 21 has certain physical characteristics and internal stresses as a result of its design. The application of the cellular matrix and resulting motion control programming may be algorithmically automated to respond to the geometry and stresses within the wall by allocating certain patterns of formation 2201, 2202, or 2203 to certain ranges within the wall. In an area of higher stress, geometry 2101 may be applied to range A1, but in an area of lower stress, geometry 2102 may be applied to range B2. This method of algorithmically responding to the necessary requirements of a given wall area may significantly simplify the programming and reduce material use by optimizing the internal structure for the stresses needed to be resisted.

Feedback Sensors

To ensure accuracy in the built structure, feedback and adjustment mechanisms may be employed that sense the actual conditions of the joints and other previously applied materials, as distinguished from the ideal designed conditions of the joints and previously applied material. Since deflection, material creep, wind, temperature, and other real world conditions will affect the previously extruded areas, methods to dynamically adjust the motion and extrusion parameters to accommodate these factors may be employed to increase the accuracy of the end result. Some of the methods may include range finding, optical feedback, motion sensing, photogrammetry, motion capture, sonar, lidar, among other feedback mechanisms.

Motion Methods

Figure 22:
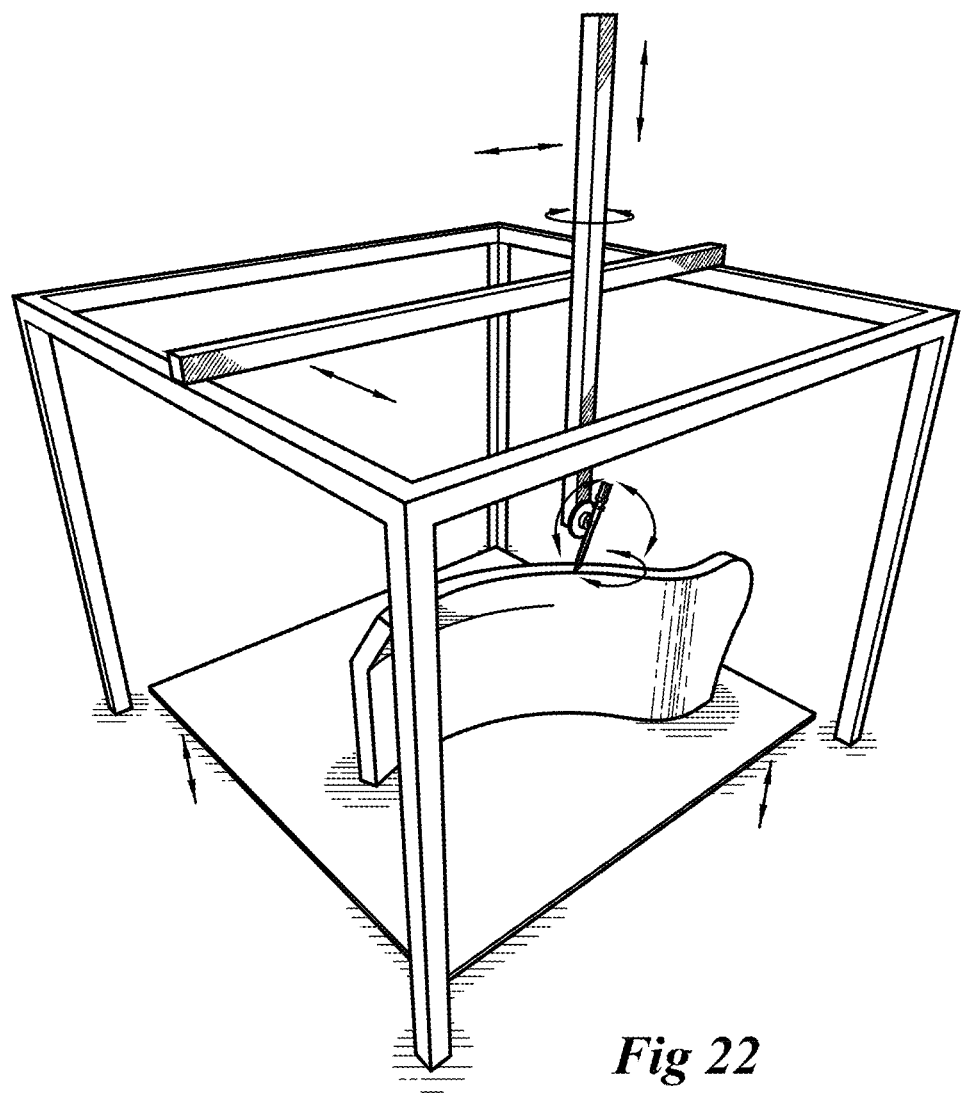
FIG. 22 is a perspective view of an object being constructed with a movement mechanism capable of multiple degrees of motion.
Figure 23:
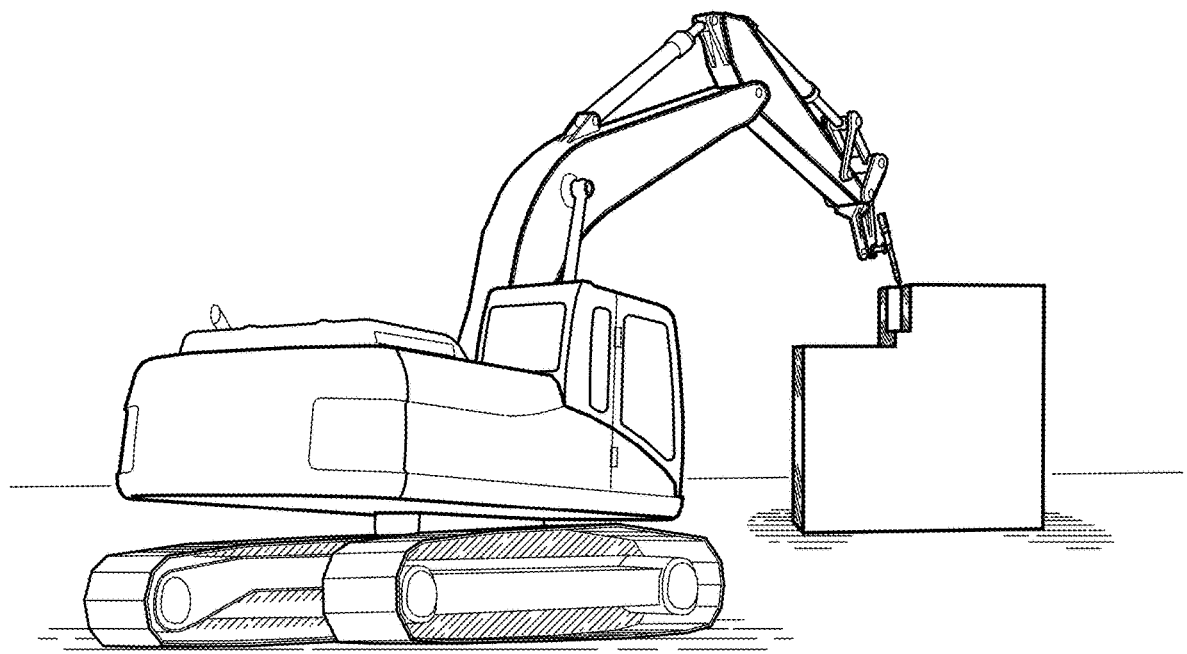
FIG. 23 depicts a mobile platform for manipulating an extruder.
Figure 24:
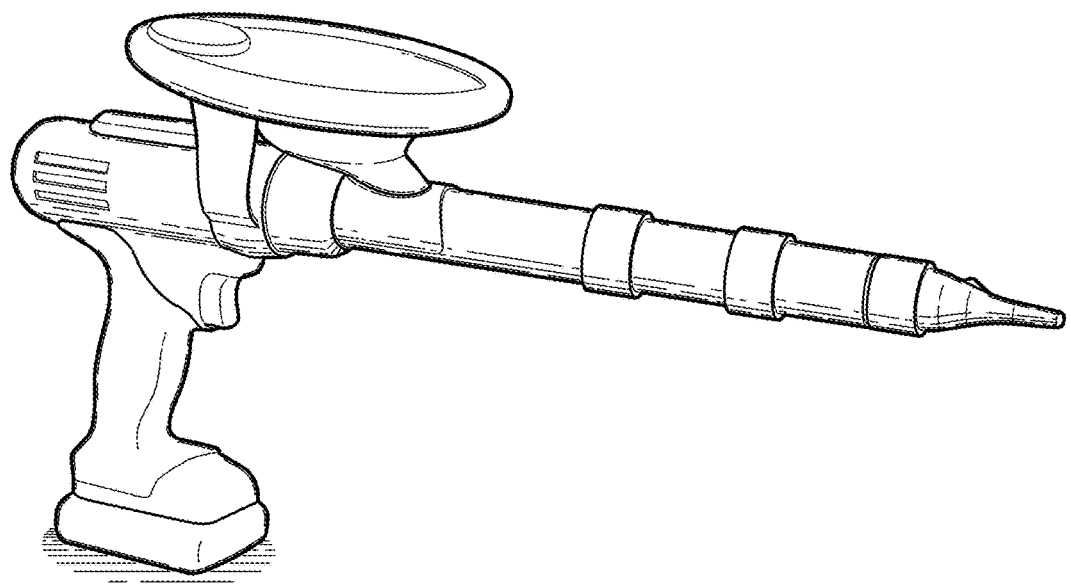
FIG. 24 depicts a hand-held embodiment of an extruder of this invention.
Figure 25:
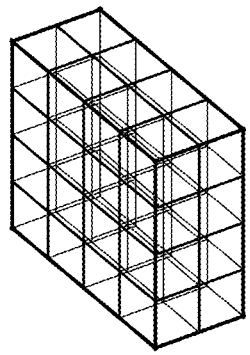
FIGS. 25-30 are schematic depictions of exemplary cellular structures of various embodiments of this invention.
Figure 26:
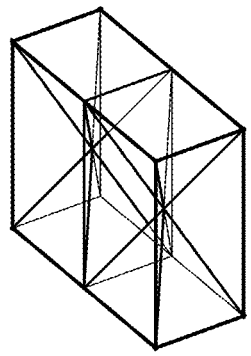
Figure 27:
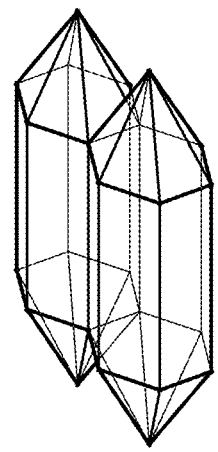
Figure 28:
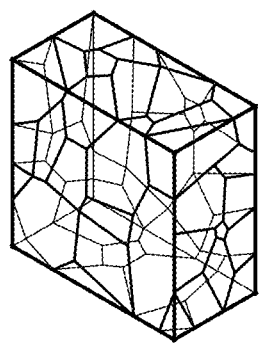
Figure 29:
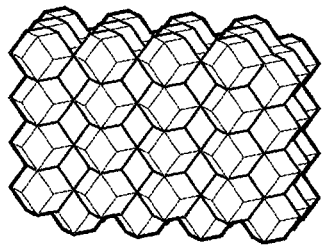
Figure 30:
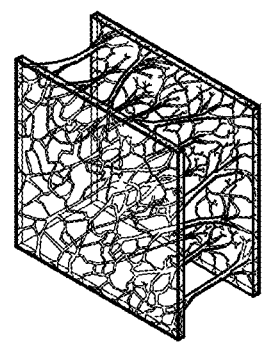

As shown in the drawings, alternative methods for moving the extruder may be employed. These may include, without limitation, a gantry system, CNC system, or traditional 3D printers with additional axes of control as illustrated in FIG. 22, hydraulic equipment as depicted in FIG. 23, or handheld versions of the extruder as shown in FIG. 24.

The explained above, purpose for the extruder and the movement mechanism is to connect points to create a pathway along which material is deposited. Each pathway is added to others to finally create the cellular matrix which makes up the internal structure of the final building or object.

Cellular Matrix

The cellular matrix is created by a applying a given cellular pattern to the internal volume of a solid as illustrated with the examples of FIGS. 25-30. The cellular pattern may be self-repeating or may be different from one cell or group of cells to another. Idealized versions of the structures of molecules, plant, animal, or human cells, minerals, foams, naturally occurring patterns, mathematical formulae, polyhedral, space frames, trusses or other patterns may be used to modularize the internal volume of the overall structure. The purpose of the cellular matrix is to create a balance between material used, space occupied, and strength derived from a certain pattern. The material, diameter, shape, and length of each extruded segment will determine the density of the cellular matrix. As with natural cellular constructions, various qualities may be modulated to achieve various results but may include structures to add strength, separation, flexibility, openness, rigidity, and specificity of function among other beneficial qualities.

In addition to the above-described and illustrated methods of construction of the cellular matrix, there are other methods of fabricating the cellular matrix that do not include extrusion, but may produce substantially similar end results. For instance, crystallizing foam, growing organic structures, the drying process within a medium, modular bricks, connected faces of a panelized structure or using conventional additive manufacturing to make the structures specified in this patent.

Added Materials

The strength and durability of a structure may be a function of the extruded material alone, but additional benefits may be realized by utilizing the cellular matrix as a scaffold onto which other materials are applied to fill the voids between the individual segments. Similar to a living cellular structure, the cell walls alone provide some strength, but in most cases without the internal volume filling material, the structure would not hold up. Like the water pressure in human bodies, calcification in bones, or turgor pressure in plants, the material filling the cells provides additional strength for structural support. In one aspect of the present invention, a similar method of construction utilizes material filling the cellular matrix to additionally strengthen the overall structure.

Other methods to combine materials with the cellular matrix may be used such as attachment of materials to the exterior faces or that grow into the voids of the structure.

Walls & Buildings

Figure 31:
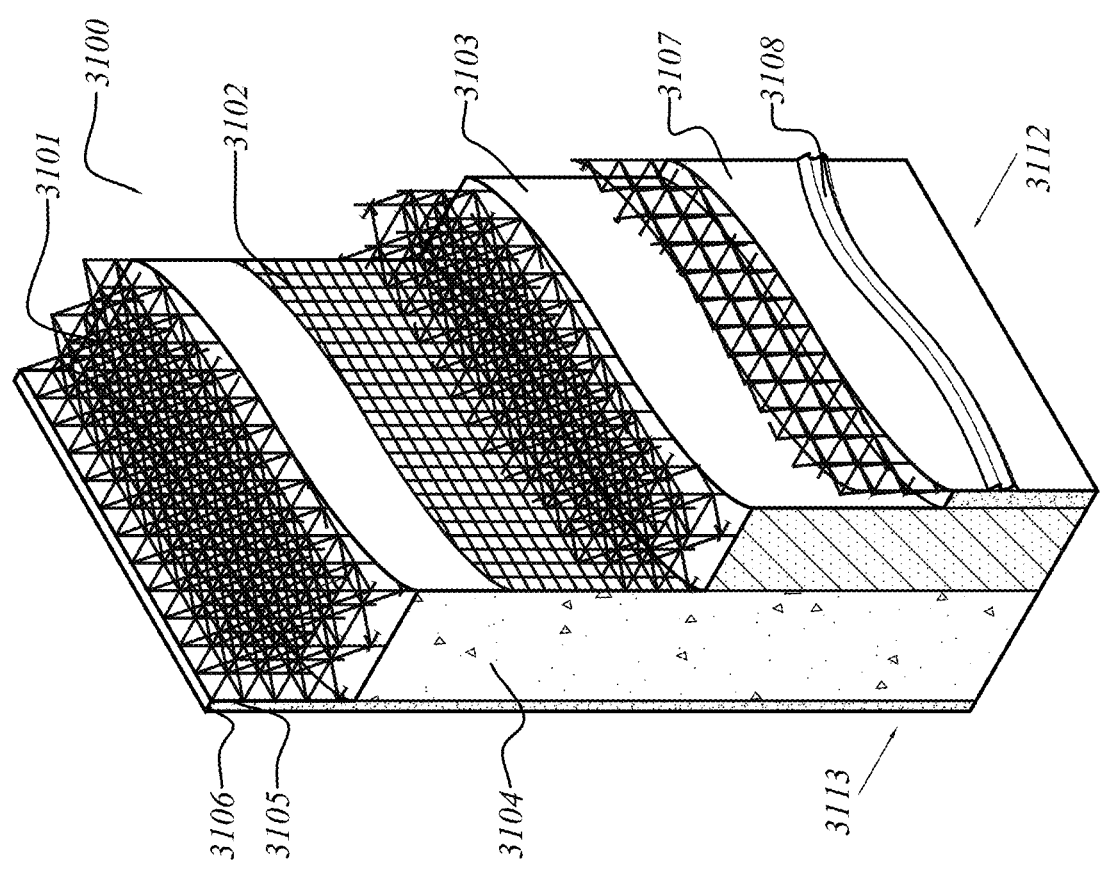
FIG. 31 is a schematic perspective view of a structure of an embodiment of this invention.

In a structure used as a building, one method for filling the cellular matrix may be described with reference to FIG. 31, where the internal structure 3101 of a wall 3100 includes a septum layer 3102 that separates one area of the wall from the other areas. Multiple septums 3102 may be utilized, but in this example one septum layer 3102 is used. Spray foam insulation is applied from the interior side 3112 of the wall and is stopped by the septum layer 3102 from penetrating further into the wall assembly. The spray foam 3103 fills a depth determined by reference to the R-value desired from the wall assembly 3100.

The next step is the application of concrete 3104 from the exterior side 3113 by means of a shotcrete, pumping or other appropriate application mechanism or technique. Concrete 3104 may be applied so that the entire matrix 3101 is filled with concrete 3104 and then finished or the concrete 3104 may be applied in a thickness that leaves the exterior face grid 3105 partially exposed. A stucco finish 3106 may then be applied using the outer face 3105 of the cellular matrix as lathe to which the stucco is secured. Other exterior finishes may also be utilized that are attached to the concrete 3104 and grid 3105 utilizing existing or yet to be developed construction practices and products. Once the concrete 3104 cures, it may serve as a significant structural element of the building, as is common in thin shell concrete construction. In this case, however, the cellular matrix 3101 is acting as both a form and part of the tensile reinforcement of the concrete. After sufficient curing of the concrete 3104, spray applied gypsum 3107 may be applied to the interior face 3112 of the structure, struck off with a tool, sanded smooth, and finished as is common with other interior wall finishes. Numerous other interior surface finishes may also be used.

Certain areas or portions 3108 of the cellular matrix may be extruded in a solid fashion to create decorative trim elements 3108, joints, or to help integrate other fixtures or equipment into the wall assembly. Conduit, raceways, wiring, airways, and pipes may be either printed in situ or integrated after the concrete cures. If completed after the concrete cures, spaces may be routed out in the foam 3103, and normal conduit/piping may be placed in the routed voids and then reinsulated, if desired, prior to the application of the interior finish.

One optional method to increase the strength of the structure is to apply a sprayed reinforcing material that coats the outer surfaces of the extrudate and begins to build up at joints to round out and reinforce the cellular matrix. The sprayed reinforcing material may provide a rigid sheath around the extrudate, adding strength without adding substantial weight. This reinforcement technique could be analogized to the calcification method that certain microscopic sea creatures use to build their skeletons.

The addition of materials to the cellular matrix may be accomplished with conventional normal manual processes, may be automated by utilizing the movement mechanisms described here or by any other techniques that accomplish the desired addition of materials to the matrix.

Scale and Utilization

The building construction examples described here are merely exemplary; myriad other uses are possible, including, without limitation, use in the fields of building construction, manufacturing, agriculture, automotive, aerospace, fashion, three-dimensional printing, furniture, and medicine among many others. The scale in the construction industry may be between ½" to 6" or greater per segment. Smaller scale segments may be as small as those produced by skipping layers on a 3D printer on the order of 0.002". Larger scale structures may incorporate volumes and spans as great as several feet or more. The spans possible and desirable depend on material properties, extrudate section properties, and segment shape.

A small device may be built with the techniques described here. For instance, an object with hollow interior voids may be fabricated and the exterior coated with porcelain enamel to form a coffee cup. A larger scale example might be the internal wall structure of an airliner where the exterior skin is fitted over a cellular matrix with an internal space made up of insulation, an airtight pressure vessel membrane, and interior finishes.

Figure 32:
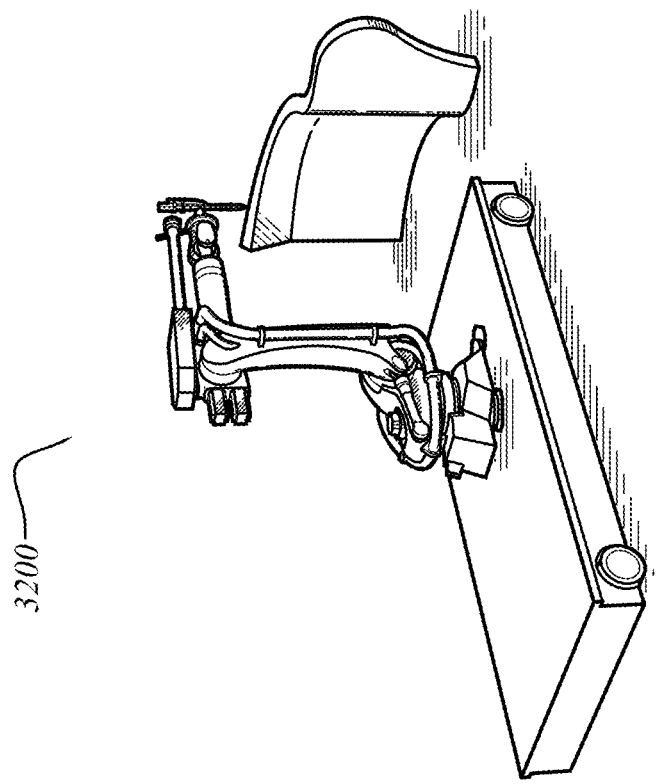
FIG. 32 is an isometric view is a mobile platform in use in accordance with an embodiment of this invention forming a wall structure.

With the robotic armature or other motion mechanisms, additional scale and motion flexibility may be gained by mounting the mechanism on a rail system that allows for a greater degree of motion. A more flexible method may be enabled by mounting a robotic arm on a mobile platform to produce a robotically controlled platform 3200 that has infinite range of motion as shown in FIG. 32.

Logic Flow

Figure 33:
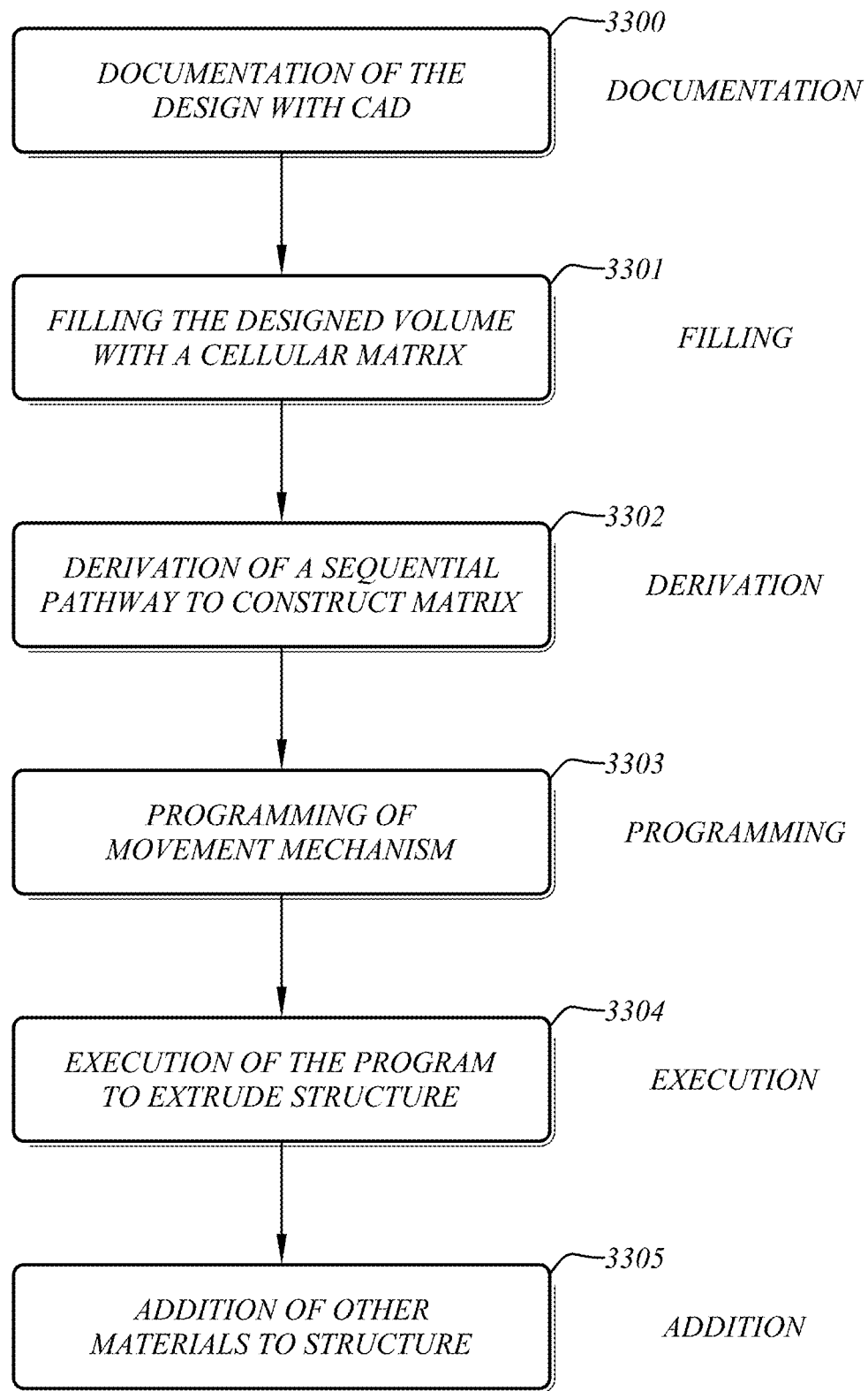
FIG. 33 depicts steps of an exemplary method of this invention.

FIG. 33 is a logic flow diagram. This is a basic, exemplary overview of steps that may be taken to produce a given structure. Numerous substitutions, alterations, modifications, omissions and the like may be possible and desirable depending on the nature of the structure being fabricated and the materials being used. In the method of FIG. 33:

a. An object or structure is conceived and documented preferably with a CAD program in step 3300.

b. This design's volume is filled with a cellular matrix having desirable properties for the final structure in step 3301.

c. A sequential pathway tracing each segment of the matrix is derived in step 3302.

d. The movement mechanism is programmed with this sequential motion pathway in step 3303. Additional information relating to speeds, temperatures, stop/start, flow, and other properties may be input with the programming.

e. The program is executed, inducing motion and extrusion to create the structure in step 3304.

f. Once portions or the whole is complete, other materials may be added to the structure in step 3305.

Septum

A septum is generally defined as a layer that separates one region from another. It may be a porous layer that is embedded in a material or a solid material that prevents material penetration or a combination of both. The septum may be an extruded structure created by the same mechanism and process which creates the cellular matrix. An additional component of the extrusion mechanism may be configured to extrude or deposit a material distinct from the matrix to form a septum during the additive process. A septum may also be a material fixed to an outer surface or embedded within the cellular matrix. Beneficial characteristics of the septum may be to separate one region of the cellular matrix from another, internally reinforce a material, provide attachment means of a material to the cellular matrix similar to a lathe, or where a densification of the printed material may provide mechanical adhesion for an added material.

FIG. 34 illustrates various configurations of a cellular matrix, septum, and infill material. Cellular matrix 3101 has a septum that may be located at position A, B, or C or a combination of these example positions. Various materials may be added in regions 3401, 3402, 3403, and/or 3404. Materials may stop at, flow through, or generally be contained within these regions. The septum at position C may be adhered, thermally or ultrasonically welded, or otherwise attached to matrix 3101. Material 3404 may be added to the exterior of septum at position C. Septum C may act as internal reinforcing within a material, or may be a barrier to confine a material to a certain volume within matrix 3101. Septums A and B may similarly serve any of these functions.

Several possible embodiments are illustrated in FIG. 35. FIG. 35*a* illustrates a matrix 3101 with a septum at position C where material 3 is spray foam applied from exterior side 3113, expanding to a certain depth and corresponding r-value. Material 2 is concrete added from exterior side 3113 and Material 1 is a stucco with a reinforcing lathe at septum position A.

FIG. 35*b* shows a matrix 3101 with a septum at position C that restricts the penetration and expansion of spray foam material 2 to a specific region within matrix 3101. Material 1 is concrete where matrix 3101 acts as reinforcing within the concrete and bonds it to the other materials. The material 1 concrete extends beyond the face of matrix 3101 and forms the surface finish.

FIG. 35*c* illustrates a fully encapsulated matrix 3101 with a foam material 2 and a barrier material at position C. The boundary surface at septum location A may be milled to a finished surface and then material 1 may be affixed to the foam surface. Material 3 may also affixed to the outer bounds of septum C.

Figures are merely illustrative and material/septum combinations may take on many other configurations. The septum may also range from location to location within the same assembly.

One embodiment of the septum may be produced by freeform or layer-based extrusion. In this manner, the septum may be at position A, B, or C in FIG. 34 and may be extruded at the same time as the matrix, but in an appropriately dense freeform or layer-based configuration, or may be secondary material deposited along the surface of matrix 3101 at position C. The septum may be solid barrier or open lath. The septum may be an integral subsurface of varying parameters to which other added materials may bond, forming an exterior surface of a solid assembly. In this instance, the bond between septum and materials may provide the properties of a composite material.

Enclosed Septum

Figure 36:
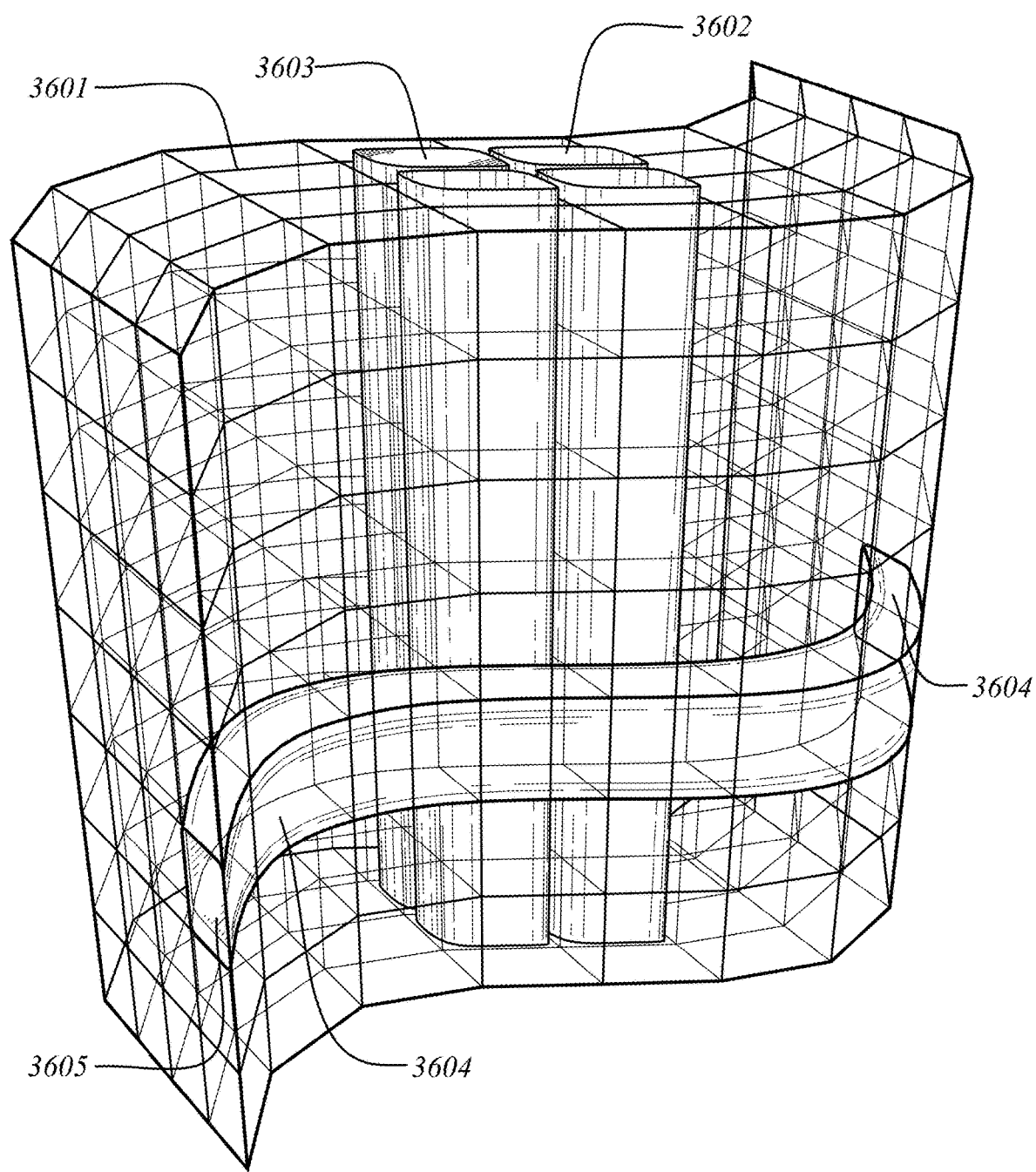
FIG. 36 illustrates an enclosed septum in various arrangements.

FIG. 36 illustrates an embodiment in which a septum fully or substantially encloses a discrete volume within Cellular Matrix 3601. Matrix 3601 may provide both the shape of the assembly as a whole and may frame the interior passageways or regions to be enclosed by a closed septum 3602. The closed septum 3602 may be a sleeve or tube of flexible material, like a sock, that may be inserted into cellular matrix 3601 and subsequently filled with material 3603, such that the filled septum expands to fill and conform to the interior volume framed by the cellular matrix. The closed septum 3602 may be any material that performs the functions listed herein and may be made of fabric, plastic, polymer, metal, cementitious, rubber, dissolvable material, sprayed material, piping, 3D printed material, or other functional materials. Added filler 3603 may be concrete, foam, sand, water, air or other materials. The closed septum 3602 may be used as reinforcing within the cellular matrix 3601 and may contribute to compressive and/or tensile load bearing capacity.

The cellular matrix 3601 may provide the rough shape when the closed septum 3602 is filled 3603. The septum and material may act as reinforcing tubes within a wall or other assembly. They may be bundled as illustrated in FIG. 36 or may be singular tubes as shown in 3604. If closed septums 3602 are bundled they may be bound with other materials, by the matrix itself, or multiple tubes may exist in one channel. Closed septums may also vary in size, cross section, and configuration to respond to forces, or create forces within an assembly.

Closed septums 3602 and filler 3603 may be located in a variety of locations within the cellular matrix 3601 to alter the properties of the composite assembly. Filler material 3603 or 3605 may add mechanical, thermal, electrical or other properties to the composite. Larger closed septums 3602 may provide a large central chamber for filler material 3603 or multiple smaller closed septums may be stacked adjacent to one another in a vertical or horizontal plane to act as a generally planar septum for the addition of other materials, or around the perimeter of a cellular matrix to provide a cavity in the middle.

A closed septum 3604 may also be filled 3605 with air, water, or dissolvable material temporarily while the remaining space within the cellular matrix 3601 is filled with other materials. The filler 3605 air or water may then be drained or dissolved to provide an open raceway for wiring or pipes or may be kept as an air or water passage.

The interior of a closed septum within a cellular matrix may be filled with a material or house a component of the assembly. The filled or occupied septum may function as any kind of load-bearing element or other conventional element of the assembly being fabricated. In architectural, infrastructure, or other construction applications, closed septums and resulting internal volumes may accommodate insulation, utility infrastructure, heating and cooling, drainage, ducts, or more recent innovations such as storage for batteries, rainwater, or filtration devices for water or air. Applications of composite cellular matrix assemblies in other industries such as aerospace or marine components may utilize internal septums and voids for storing fuel, air, water, or other resources. Electrical and mechanical systems may also utilize voids or cavities created using closed septums.

Composite

The terms 'composite material' or 'composite assembly' as they are used herein refer to a combination of materials in an integral manner which results in a product having properties superior to those of the individual materials which comprise it. The cellular matrix may serve structural and other purposes without the addition of filler materials, but increased performance and additional functionality may be achieved through the incorporation of other materials and components to form a composite material or assembly. Just as the pattern of a woven glass or carbon fiber in a resin-fiber composite may be configured for certain loading properties, so the cellular matrix may be configured to achieve certain performance criteria either as a standalone component or as a composite. As in the case of fiberglass-resin composites, superior qualities are often the result of combining products which have opposing modes of failure.

In the case of compression loading, the mode of failure of the cellular matrix may be buckling of its individual members or struts. When another material such as expanding foam is added to the matrix, surrounding each strut, it is braced along the entire length of the strut by the expanding foam. The foam prevents the strut from deflecting or buckling out of plane, thereby increasing the compressive force that may be borne by the composite assembly. Likewise, the foam is prevented from crushing by the cellular matrix. The compressive strength of either the cellular matrix or expanding foam may be less than the composite strength of the overall assembly.

The matrix may also receive materials which are themselves composites. In one such embodiment, the cellular matrix may be used as a form which is wrapped in resin-impregnated carbon fiber to form a lightweight and rigid composite airfoil or hydrofoil. The properties of this composite may be further enhanced by filling the resulting shell-matrix structure with a rigid foam. Various degrees of composite behavior may be achieved through such combinations.

Figure 44:
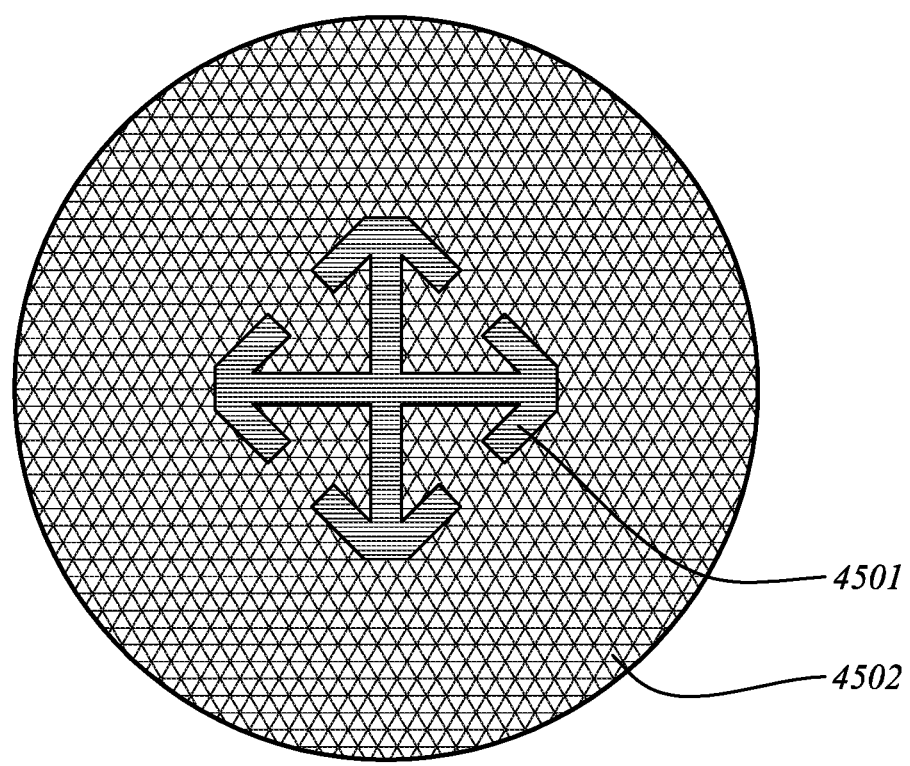
FIG. 44 is a diagram illustrating the formation of a mechanical bond between a shaped extrusion profile and an infill material added to the cellular matrix.

Composite assemblies may be fabricated through added chemicals for chemical bonding at joints or structurally wrapping joints for tensile reinforcing. One example would be with the profiles illustrated in FIG. 44 that have a branching arm of extrudate in cross section. Added materials 4502 would fill between the arms 4501 and physically interlock the extrudate with the added material. The goal in some instances may be to increase the structural link between the two materials, in other instances a chemical may be added to the matrix to cause slippage or non-contact between two materials. Beneficial composite effects may be designed into the manner of creating a cellular matrix and the method of placing additional materials into or on the matrix.

Freeform Additive Manufacturing

Freeform additive manufacturing (FAM) departs from conventional additive manufacturing in several respects. First, rather than discretizing the volume of an object through 'slicing', in which the object is subdivided into generally planar layers, FAM utilizes computational meshes to generate 'cells' which are made up of various numbers of segments.

Second, where conventional methods deposit or fuse material in successive layers corresponding to the digital slices comprising an object, FAM utilizes freeform extrusion to deposit materials along three dimensional pathways which may vary in sequence depending upon the topology of the cell (e.g. tetrahedra, icosahedra, etc.), and along which material may be actively solidified so as to retain its three dimensional shape even where it is supported by underlying structure only at a point or node, rather than along a line or polyline. This is to say that where other methods rely upon generally laminar deposition of material, even where such deposition is not planar, FAM may deposit material along freeform pathways without substantial contact with or support from any underlying structure or material.

Figure 37:
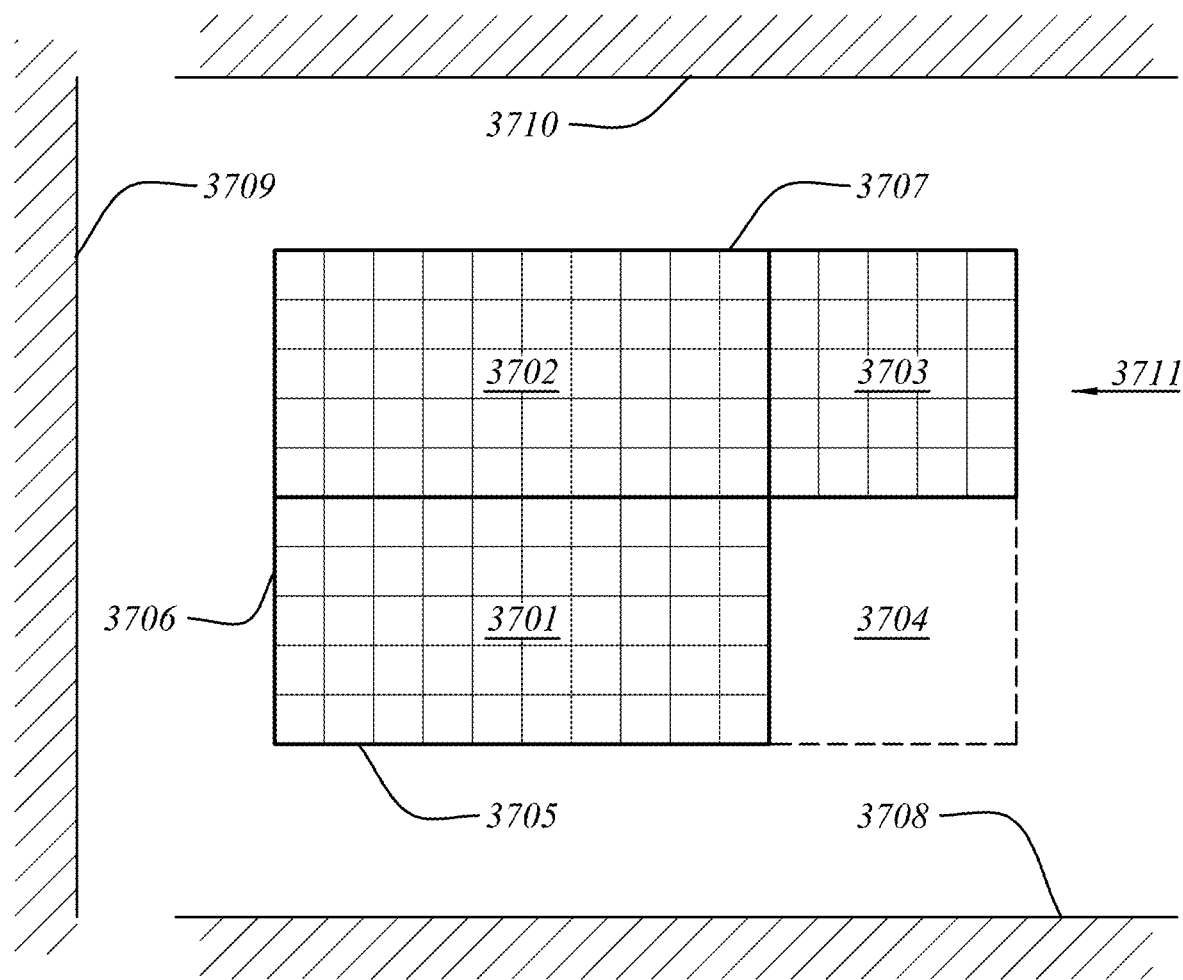
FIG. 37 is a diagram illustrating freeform printing advantages.

Freeform additive manufacturing allows material to be added to an object at any angle or orientation. In FIG. 37 an object 3711 is constructed. When constructed with a horizontal base platform 3708 region 3702 is built atop 3701. With freeform additive manufacturing region 3703 may be constructed on the side of region 3702. There may be no need for any supporting material in region 3704 as is common with typical 3D printing techniques. The movement mechanism 102 from FIG. 1 may be oriented to build up material to the side of region 3702. Additional benefits of freeform additive manufacturing may be to construct object 3711 starting from a vertical build platform 3709 or ceiling build platform 3710 or other orientation of build platform. In the case with a vertical build platform 3709, material may be added directly horizontal or vertical, without regard to gravity, layerwise buildup, or support material.

Selective Solidification

One beneficial characteristic of freeform additive manufacturing is that material may be selectively solidified almost immediately upon exit from the orifice. Material may also be built up in a laminar fashion and then switched to freeform upon changes in parameters. It may be beneficial to utilize both laminar and freeform extrusion as the need may arise. Freeform AM may also solidify material almost wholly upon exit from the aperture or may leave it partially molten to allow process speeds to increase. The degree of solidification and the location at which solidification occurs may be modulated by process parameters available within this invention.

Extrudate Shape

Figure 38:
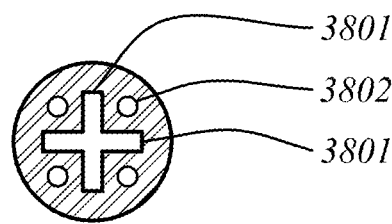
FIG. 38 is a diagram of a nozzle orifice.

A nozzle orifice is shown in FIG. 38 with a shaped die 3801 and orifice in proximity to cooling channels 3802 that facilitate solidification of the extrudate. Extrudate flows out of an orifice 3801 with one embodiment shaped as shown with a plurality of arms in various directions. Cooling channels 3802 may be incorporated as shown within the nozzle and near upon exit from the nozzle same or other cooling channels are used to facilitate solidification of the extrudate upon exit from the extruder.

Figure 39:
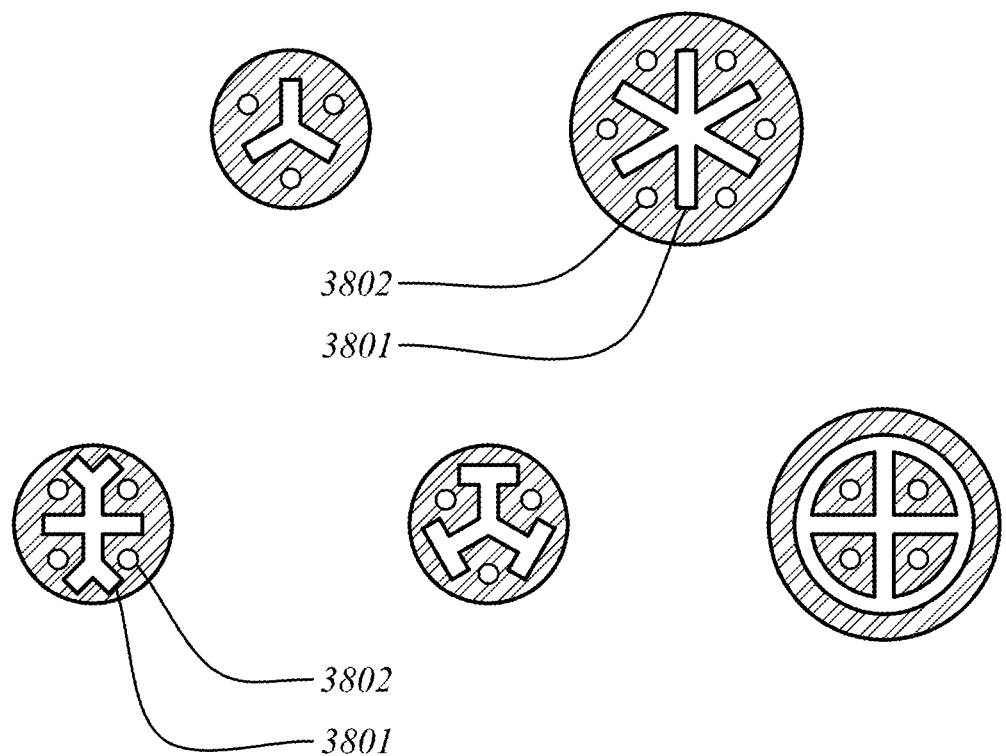
FIG. 39 shows several possible extrudate shapes and cooling configurations.

Various configurations of a multi-armed extrudate shape are illustrated in FIG. 39 that may include compound arms or branching lobes. A general principle in some embodiments of this invention is that surface area of the extrudate is maximized while cross sectional area is minimized in order to facilitate greater solidification. Such arms may also serve to prolong the length for which the cooling fluid flows along the extrudate member in order to better facilitate solidification of the material.

Figure 40:
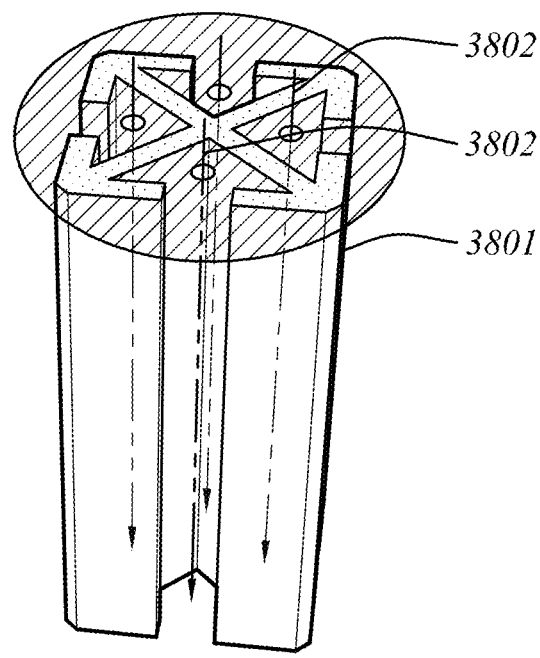
FIG. 40 is an axonometric view of cooling fluid flowing through channels formed within the extrudate.

The sections shown in FIG. 39 may have cooling fluid 3802 flowing between or upon the arms of the shaped extrudate 3801. FIG. 40 illustrates a similar embodiment wherein the cooling fluid may flow within partially or fully enclosed channels within the shaped extrudate.

The heat of the nozzle assembly may keep the plastic molten through the extrusion process. The proximate location of cooling passages may interact with the extrudate internal and external to the orifice. The relationship of heating and cooling mechanisms proximate to an extrusion shape may enable freeform extrusion, solidification near upon exit from the nozzle, and selective solidification of extrudate upon exit from the nozzle. These relationships may be dynamic and controlled in a dynamic manner.

Extrudate Temperature Control

With the embodiment illustrated in FIGS. 38 and 39, the heating and cooling mechanisms are integral to the nozzle assembly and allow for freeform extrusion that solidifies near upon exit from the nozzle, selective solidification of extrudate, laminar buildup of material, and heat welding of additive joints.

FIG. 42 shows several possible configurations of a cooling system which may be integral to the nozzle assembly, and how each configuration produces selective solidification characteristics.

Figure 42A:
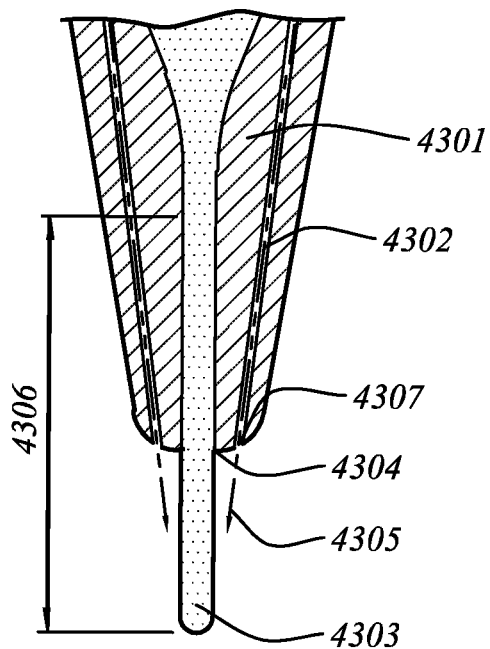
FIGS. 42a, 42b, and 42c are diagrams that illustrate the effects of various cooling system configurations upon the extrudate.

FIG. 42a depicts one embodiment of a nozzle 4301 having cooling fluid passages 4302 located near the extrudate 4303 within the nozzle, and which have apertures 4307 near the nozzle opening 4304 where the cooling fluid 4305 flows directly onto the extrudate. In this embodiment, the region wherein the extrudate is actively cooled 4306 includes a portion of the interior of the nozzle as well as some distance beyond the nozzle opening.

Figure 42B:
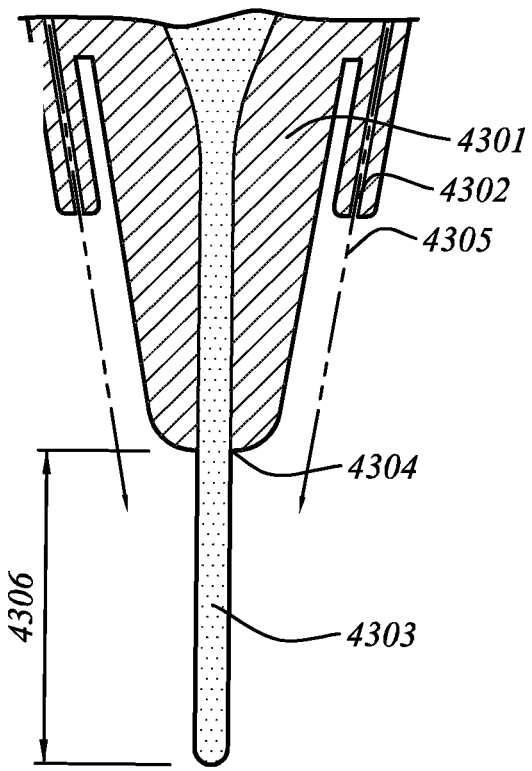

FIG. 42b depicts another embodiment of a nozzle 4301 having cooling fluid passages 4302 which may be integral to the nozzle assembly, but are not located immediately adjacent to the extrudate 4303 and nozzle opening 4304. In this embodiment, the region wherein the extrudate is actively cooled 4306 is shifted downward, does not significantly extend into the nozzle interior, and may also exclude a short distance beyond the nozzle opening. This can allow the extrudate to remain hot within the area immediately outside the nozzle opening which may facilitate heat welding at connections between members or layers of extrudate.

Figure 42C:
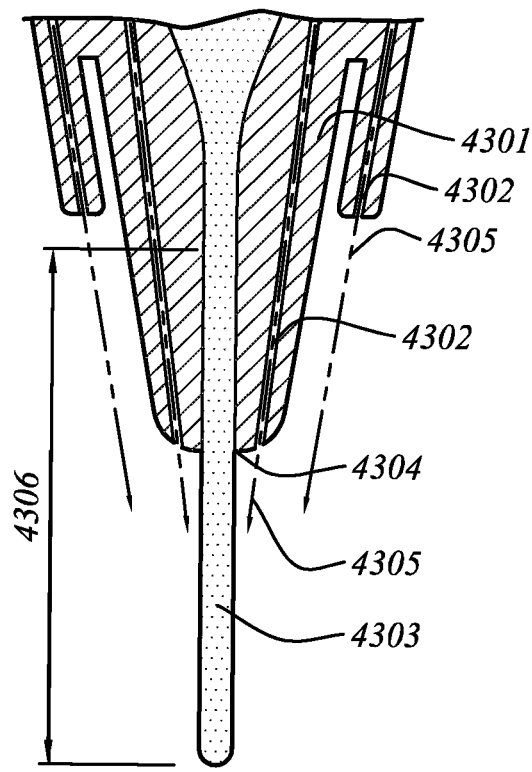

FIG. 42c depicts another embodiment of a nozzle which may combine configurations shown in FIGS. 42a and 42b. Multiple cooling fluid arrangements may be used independently or in combination to achieve precise control over the solidification of the extrudate. All of the cooling configurations shown in FIG. 42 may be used in combination with aspects of other nozzle embodiments disclosed herein.

Figure 46:
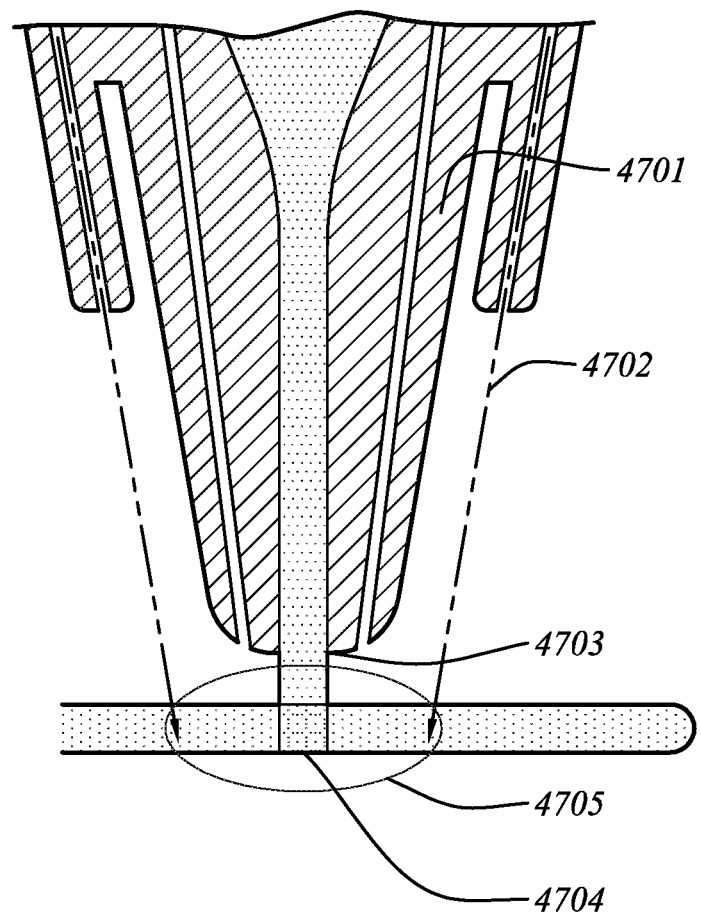
FIG. 46 depicts a nozzle which facilitates heat welding of connections within the cellular matrix.
Figure 47A:
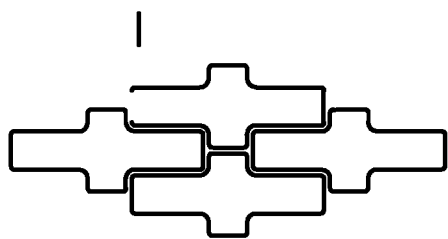
FIGS. 47a, 47b, 47c, and 47d are diagrams illustrating profiled laminar extrusion.
Figure 47B:
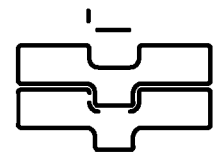
Figure 47C:
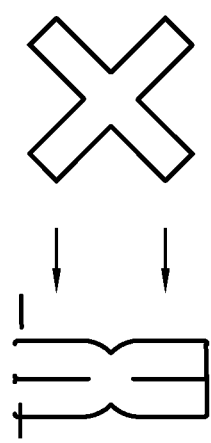
Figure 47D:
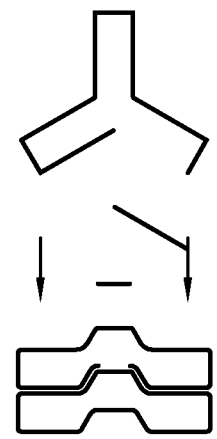

FIG. 46 shows one embodiment of a Nozzle 4701 which directs a Heating Medium 4702 through an opening which may be integral to the Nozzle. The Heating Medium 4702 is directed toward the Nozzle Orifice 4703 where material exits the nozzle and forms a Joint 4704 with previously solidified material, resulting in a Heat Weld 4705 having desirable bond strength.

Figure 41:
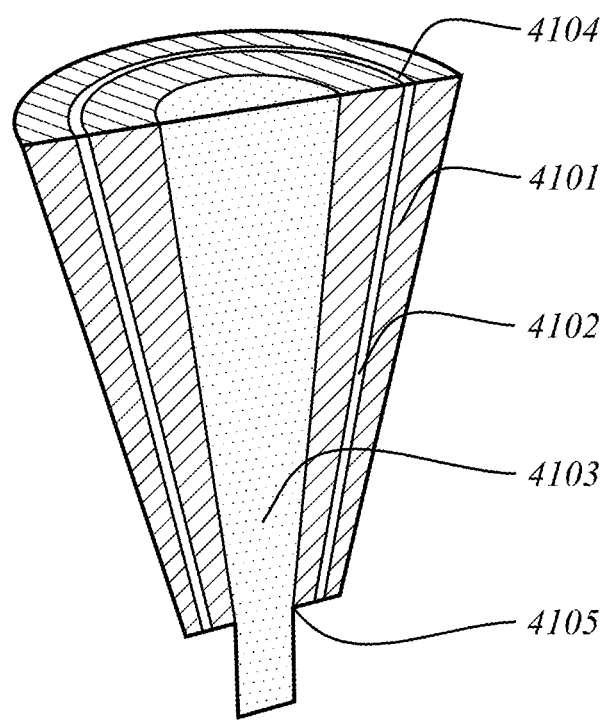
FIG. 41 is an axonometric view of a nozzle with a cooling passage.

FIG. 41 depicts the use of an annular ring 4104 configuration through which cooling fluid 4102 may flow within the nozzle 4101 and/or onto the extrudate 4103 upon exit from the nozzle orifice 4105. The distance between the annular cooling passageway and the extrudate and nozzle orifice may vary in a similar manner to the passageways shown FIG. 42. Multiple annular passageways may also be incorporated in the nozzle design and used independently or in combination as depicted in FIG. 42.

FIG. 48 depicts a nozzle wherein internal passages within or integral to the nozzle body 4901 allow the flow 4902 of a material which serves as a bonding agent, such that the bonding agent 4902 may accumulate at a connection point 4904 within the cellular matrix. The bonding agent may be an adhesive suited to the polymer being extruded, such as an epoxy or resin, or may alternatively be a solvent suited to the polymer being extruded, such as acetone in the case of ABS.

The nozzle may be manufactured using any one or a combination of methods which include but are not limited to casting, machining, and sintering. Additive forms of these methods in particular may be used to manufacture multiple systems within a single nozzle device.

Extrusion Orientation

The shape of the extrudate may be designed such that it provides the same or comparable performance characteristics when extruded at various angles relative to the median axis of the extruder or nozzle. Performance characteristics may include but are not limited to: rate of solidification, structural properties, and integration with added materials within a composite assembly.

Co-Extrusion of Multiple Materials

FIG. 15 depicts the coaxial extrusion of a secondary polymer or polymers within or surrounding the primary polymer, having distinct material properties from the primary polymer which enhance desirable performance characteristics such as solidification for freeform extrusion, and chemical or mechanical integration of filler materials within the final extruded structure.

The nozzle orifice in FIG. 38 may also extrude additional materials within and surrounding the extruded polymer. This may include one or more fiber additives such as wood, carbon, glass, steel, potassium titanate, aramid, and other compatible fibers for additional tensile and flexural strength. Each of these fiber types may be added in chopped form or as a continuous strand.

Other additives which may be extruded within the primary polymer may be used to achieve functions such as protection from degradation by ultraviolet light, fire resistance, or resist damage from other environmental conditions. Another class of additives may be used to increase the adhesion of the polymer to itself, such as polymer chain extenders. These additives facilitate molecular cross-linking across polymer chains in order to provide better strength properties, particularly in tensile loading. These improved properties may improve the bond strength between extruded members, and also may reduce both ductile and brittle fracture as well as buckling of individual members. Chain extension may be especially useful in layer-based additive extrusion, where material is deposited upon previously extruded layers which may still be hot, facilitating the chain extension reaction between layers. The inter-layer bonds in additive extrusion are conventionally the points of failure in structural applications; therefore, the combination of a shaped extrusion profile (providing greater surface contact and mechanical bonding) and polymer chain extending compounds (providing molecular bonding between unhardened polymer layers) may significantly improve the structural properties of layer-based additive extrusion products.

FIG. 43 shows several possible arrangements of multiple polymers and additives within the cross-section of the extrudate.

Figure 43A:
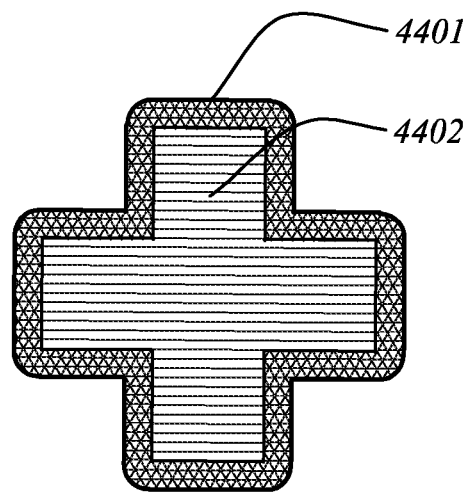
FIGS. 43a, 43b, and 43c illustrate possible extrusion configurations which incorporate additional material to more rapidly stiffen the extrudate to become self-supporting.

FIG. 43a shows a secondary material 4401 extruded as a jacket enclosing the primary material 4402. In this instance, the secondary material 4401 may solidify or stiffen more quickly than the primary material 4402 and may thus be used to increase process speed where the primary material may offer superior structural performance. The same configuration may use the secondary material 4401 to facilitate bonding with a filler material such as cement. An enclosed jacket configuration as illustrated in FIG. 43a may be particularly desirable if the secondary material 4401 may act as a protective layer providing resistance to ultraviolet exposure, thermal expansion, impact loads, flame spread and smoke development, or other adverse conditions.

Figure 43B:
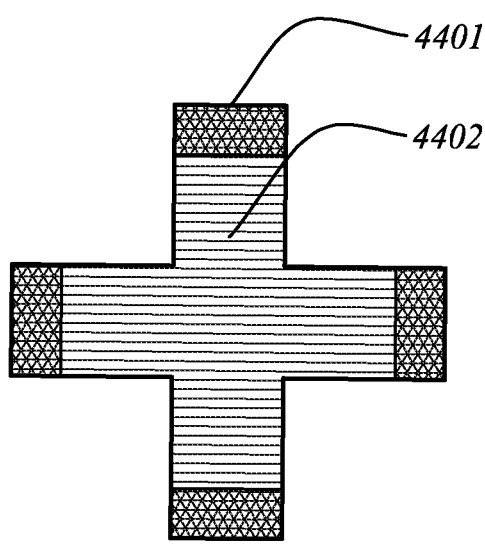

FIG. 43b shows a secondary material 4401 extruded along a portion of the perimeter of the primary material 4402. This embodiment in particular may take advantage of a secondary material 4401 which solidifies rapidly to stiffen a primary material 4402 which has desirable material properties but which hardens more slowly, such that the product may benefit from the properties of the primary material 4402 and the manufacturing process may benefit from the properties of the secondary material 4401.

Figure 43C:
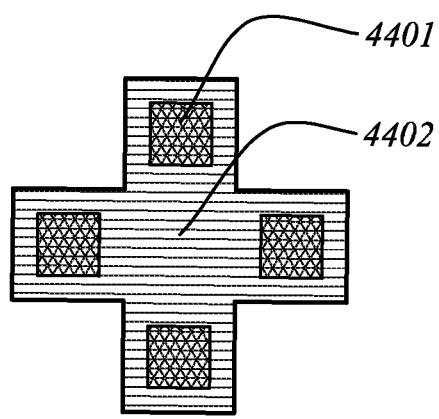

FIG. 43c shows rods of secondary material 4401 embedded within the protrusions of the shaped extrudate. Such a configuration may incorporate secondary materials 4401 such as a fiber, strand, wire, or other component which may offer added tensile strength.

The configuration of the extrudate shown in FIG. 43c may also utilize a secondary material 4401 which melts at a slightly higher temperature than the primary material 4402, such that when the nozzle cooling system is active the extrudate remains solid or sufficiently rigid to support the molten primary material around it. However, when the nozzle cooling system is not active or less active, or if the temperature of the nozzle is actively raised for an appropriate period, the extrudate may melt or soften sufficiently to be broken. At such points the extruder may stop and move to a different position without the need for a device to cut the embedded secondary material, as is needed with continuous fibers or wires.

Any of the configurations shown in FIG. 43 as well as FIGS. 15 and 18 wherein secondary materials are incorporated into the extrudate may also be used to achieve additional functionality within the matrix structure, making use of fiber-optic, dielectric, electrical or thermal conductivity, and other such properties of a single or composite extrudate.

Position Detection

Figure 45:
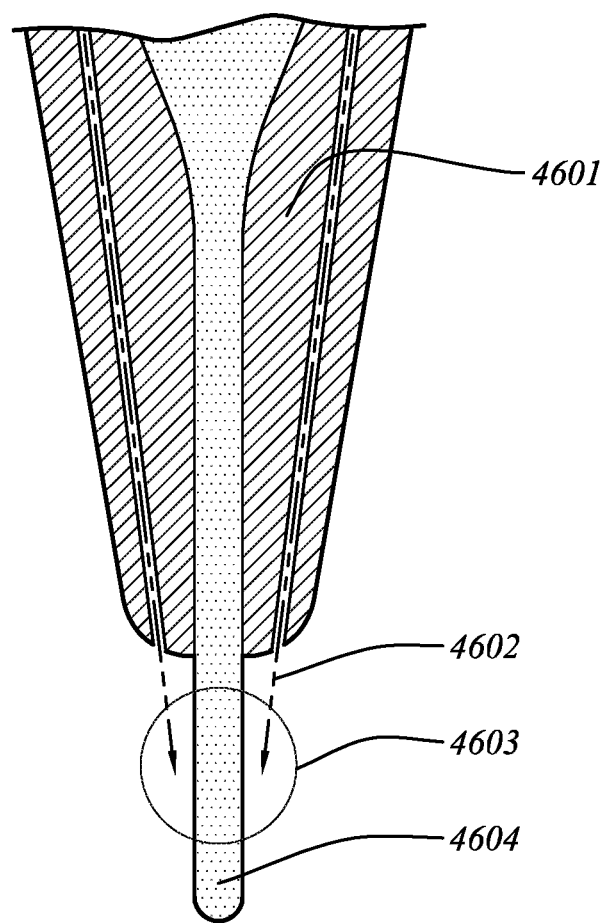
FIG. 45 illustrates a nozzle marking target points for position detection.

One such function of a secondary material is a method of marking target points such as joints or extrema within the cellular matrix. FIG. 45 depicts a nozzle 4601 which may dispense an extrudate 4604 and a marking material 4602, such as a metal powder, at a target point 4603 along an extrudate member 4604. The marking material may retain a distinct dielectric, magnetic, capacitive, or other such property which subsequently may be detected by a sensor capable of locating, storing, and monitoring the position of marked target points in three dimensional space. The sensor may be connected to the movement mechanism such changes in the location of any target point or points are communicated to the controller of the motion mechanism and extrusion system. The controllers may then adapt process parameters, motion planning, and other variables to respond to changes, repair damage, or otherwise self-correct.

Pre-Fabrication

An overall object or structure may be broken down into component parts that may be constructed separately and then joined together to make a larger assembly. Components of various sizes and configurations may be produced with this method. Components may be jointed together through various means to form a larger structure. Component jointing methods may include friction, mechanical fasteners, welding, slots, dovetails, or any other means to securely fasten one object to another. Components may be joined that have been pre-filled with other materials or may be joined together prior to the addition of other materials.

Laminar Extrusion with Shaped Extrudate

FIG. 47 illustrates methods of using a profile shaped extrudate to build up an object in a laminar configuration. As indicated in FIGS. 47a and 47b a profile shaped extrusion may add mechanical bonding between layers of extrudate. A profile shaped extrusion may increase the surface area bonding between layers and the interlayer shear resistance of an object. Additionally modulating from a profile that is appropriate for freeform additive manufacturing may also be useful for laminar buildup as illustrated in FIGS. 47c and 47d. The freeform extrusion profile shape with lobes compresses to form a flattened shape that may increase interlayer bonding and mechanical strength.

Integral nozzle cooling may also allow large parts to be constructed without regard to curling and delamination between layers. The integral cooling in the nozzle selectively solidifies the material to a point that may reduce further shrinkage and delamination.

Multi-Block Construction

FIG. 19 depicts one possible configuration of a single unit of a cellular matrix block. The unit can be printed with the faces diagonalized to add stability and strength to the overall matrix structure as well as to reduce warping. The consistent dimensioning of the overall block allows for a likewise consistent diagonalization of the units themselves.

FIG. 37 demonstrates the utility of concatenation of overall blocks. To preserve the overall geometry, block 3703 may be separated from blocks 3701 and 3702. Different concatenations of the blocks may allow the overall object to be produced.

FIG. 21 further demonstrates the utility of the concatenation of blocks. A program may diversify the application of a cellular pattern. The application of the different patterns may be facilitated by the concatenation of different blocks.

Different arrangements of the components and activities depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. An apparatus for constructing a cellular matrix structure, the apparatus comprising:
   a. an extruder for extruding cellular matrix structure components, the extruder further comprising a nozzle body comprising an extrudate pathway extending to an extrudate orifice in the nozzle body, the extruder configured to extrude a multi-arm cross sectional shape comprising at least two arms extending away from a central portion of the multi-arm cross sectional shape
   wherein the nozzle body further comprises a coolant pathway located at least partially between at least two of the arms of the multi-arm cross sectional shape and extending at least partially through the nozzle body;
   b. a multi-axis movement device for moving the extruder along multiple predetermined paths while the extruder is extruding structural components to place the structural components in desired positions and connected to selected ones of other components as the components are produced, and
   c. a controller for moving the extruder and controlling operation of the extruder.

2. The apparatus claim 1, wherein the multi-arm cross sectional shape comprises a cross shape.

3. The apparatus of claim 1, wherein at least some of the arms of the multi-arm cross sectional shape include branches, the branches each comprising a split in a portion of the arm extending away from the central portion of the multi-arm cross sectional shape.

4. The apparatus of claim 3, wherein at least some of the branches are spaced apart from the central portion of the multi-arm cross sectional shape.

5. The apparatus of claim 3, wherein the multi-arm cross sectional shape shapes an extrudate such that the extrudate includes anchor portions for strengthening a mechanical bond between the extrudate and an infill material.

6. An apparatus for constructing a cellular matrix structure, the apparatus comprising:
  a. an extruder for extruding cellular matrix structure components, the extruder further comprising a nozzle body comprising:
    (i) an extrudate pathway extending to an extrudate orifice in the nozzle body, the extruder configured to extrude a multi-arm cross sectional shape comprising at least two arms extending away from a central portion of the multi-arm cross sectional shape; and
    (ii) a coolant pathway extending at least partially through the nozzle body wherein the coolant pathway is located at least partially between at least two of the arms of the multi-arm cross sectional shape;
  b. a multi-axis movement device for moving the extruder along multiple predetermined paths while the extruder is extruding the extruded structural components to place the extruded structural components in desired positions and connected to selected ones of other extruded structural components as the extruded structural components are produced, and
  c. a controller for moving the extruder and controlling operation of the extruder.

7. The apparatus of claim 6, wherein the coolant pathway is configured to carry a coolant and wherein the extrudate pathway is configured to carry an extrudate, wherein the coolant pathway is configured to at least partially cool the extrudate while the extrudate is in the extrudate pathway.

8. The apparatus of claim 6, wherein the coolant pathway is configured to carry a coolant and wherein the extrudate pathway is configured to carry an extrudate, wherein the coolant pathway is configured to at least partially cool the extrudate after the extrudate is extruded from the extrudate orifice.

9. The apparatus of claim 6, wherein the coolant pathway is configured to carry a coolant and wherein the extrudate pathway is configured to carry an extrudate, wherein the coolant pathway is configured to at least partially cool the extrudate while the extrudate is in the extrudate pathway and after the extrudate is extruded from the extrudate orifice.

10. The apparatus of claim 6, wherein the coolant pathway extends to a coolant orifice such that coolant will contact an extrudate at the extrudate orifice.

11. The apparatus of claim 6, wherein the coolant pathway extends to a coolant orifice such that coolant will contact an extrudate downstream of the extrudate orifice.

12. The apparatus of claim 6, wherein the coolant pathway includes at least a portion with a cross sectional shape that extends at least partially around a portion of the extrudate pathway.

13. The apparatus of claim 6, wherein the apparatus further comprises a heating fluid pathway.

14. The apparatus of claim 13, wherein the heating fluid pathway extends to a heating fluid orifice in the nozzle body such that a heating fluid will contact extrudate outside of the nozzle body in a heating zone.

15. The apparatus of claim 14, wherein the heating zone is located at a connection point between the extrudate and a second structure.

16. The apparatus of claim 15, wherein the second structure is a second segment of extruded material.

17. The apparatus of claim 6, wherein the apparatus further comprises a marking medium pathway configured to direct a marking medium onto a discrete portion of an extrudate extruded by the extruder.

18. The apparatus of claim 6, wherein the multi-axis movement device comprises a robotic arm movable in at least three degrees of freedom.

19. The apparatus of claim 6, wherein the extruder comprises an extrusion screw.

20. The apparatus of claim 6, wherein the apparatus is configured to extrude extrudate onto a non-horizontal, a vertical, or a ceiling-located build platform.

21. The apparatus of claim 6, wherein the apparatus is configured to extrude extrudate onto a non-planar build platform or non-planar object.

22. The apparatus of claim 6, wherein the apparatus is configured to extrude an extrudate into areas where the extrudate is not directly supported underneath.

23. The apparatus of claim 6, wherein the apparatus further comprises a sensor configured to sense a change in at least one of position and orientation of extruded material after extrusion.

24. The apparatus of claim 6, wherein the controller is configured to adjust a coolant flow of the apparatus.

25. The apparatus of claim 24, wherein adjusting the coolant flow comprises adjusting a flow rate or a flow location of a coolant.

26. The apparatus of claim 25, wherein adjusting the coolant flow comprises adjusting a solidification speed of an extrudate.

27. The apparatus of claim 6, wherein the extrudate orifice comprising a multi-arm cross sectional shape, wherein the coolant pathway comprises a plurality of coolant pathways, and wherein at least one of the coolant pathways is at least partially located between two arms of the multi-arm cross sectional shape.

28. The apparatus of claim 6, wherein the extruder is configured to co-extrude structural components comprising a first material and a second material.

29. The apparatus of claim 28, wherein the first material comprises a first stiffening rate and the second material comprises a second stiffening rate, the second stiffening rate being faster than the first stiffening rate.

* * * * *